(12) United States Patent
Saavedra

(10) Patent No.: US 11,767,824 B2
(45) Date of Patent: Sep. 26, 2023

(54) POWER GENERATING SYSTEM UTILIZING EXPANDING FLUID

(71) Applicant: John A. Saavedra, Irmo, SC (US)

(72) Inventor: John A. Saavedra, Irmo, SC (US)

(73) Assignee: LOOK FOR THE POWER LLC, Irmo, SC (US)

( * ) Notice: Subject to any disclaimer, the term of this patent is extended or adjusted under 35 U.S.C. 154(b) by 25 days.

(21) Appl. No.: 17/170,592

(22) Filed: Feb. 8, 2021

(65) Prior Publication Data

US 2021/0164449 A1 Jun. 3, 2021

Related U.S. Application Data

(63) Continuation-in-part of application No. 16/376,354, filed on Apr. 5, 2019, now Pat. No. 10,914,292, which is a continuation of application No. 15/589,410, filed on May 8, 2017, now abandoned, which is a continuation-in-part of application No. 14/629,606, filed on Feb. 24, 2015, now Pat. No. 9,664,180, which is a continuation of application No. 14/193,087, filed on Feb. 28, 2014, now abandoned.

(51) Int. Cl.
*F03G 6/00* (2006.01)
*F03G 6/02* (2006.01)

(52) U.S. Cl.
CPC ............... *F03G 6/02* (2013.01); *Y02E 10/46* (2013.01)

(58) Field of Classification Search
CPC ......... F28D 15/0266; F28D 2015/0291; F28D 2021/008; F28D 21/001; F03G 6/001; F03G 6/003; F03G 6/02; F03G 6/04; F01K 23/10; F01K 23/065; F01K 23/06; F01K 23/08
See application file for complete search history.

(56) References Cited

U.S. PATENT DOCUMENTS

| | | | |
|---|---|---|---|
| 4,009,575 A * | 3/1977 | Hartman, Jr. | ........... F25B 27/00 422/243 |
| 4,069,672 A | 1/1978 | Milling | |
| 4,103,493 A | 8/1978 | Schoenfelder | |
| 4,280,328 A | 7/1981 | Falconer | |
| 4,291,232 A * | 9/1981 | Cardone | ............... F01K 25/065 60/671 |
| 4,405,029 A | 9/1983 | Hunt | |
| 5,176,000 A | 1/1993 | Dauksis | |
| 5,385,211 A | 1/1995 | Carroll | |
| 6,725,662 B2 | 4/2004 | Baba et al. | |
| 2006/0107681 A1 | 5/2006 | Uno et al. | |
| 2009/0179429 A1 * | 7/2009 | Ellis | ........................ F01K 17/04 60/671 |
| 2010/0244449 A1 | 9/2010 | Lee | |

(Continued)

*Primary Examiner* — Julio C. Gonzalez
(74) *Attorney, Agent, or Firm* — Dority & Manning, P.A.

(57) ABSTRACT

A system for extracting work from the expansion of a working fluid includes a vessel having at least a portion of the working fluid, a heating device in thermal communication with the portion of the working fluid in the vessel for heating the portion of the working fluid in the vessel and expanding the working fluid, and a conversion tool. The conversion tool is in fluid communication with the vessel and is configured to receive working fluid from the vessel when the working fluid expands. The conversion tool is further configured to extract work from the expanded working fluid.

18 Claims, 13 Drawing Sheets

(56) References Cited

U.S. PATENT DOCUMENTS

| | | | |
|---|---|---|---|
| 2011/0088959 A1* | 4/2011 | Corley | ............... F02B 61/00 180/65.245 |
| 2014/0075970 A1 | 3/2014 | Benson | |
| 2014/0260195 A1 | 9/2014 | McAllister | |
| 2014/0290243 A1 | 10/2014 | Enokijima et al. | |
| 2015/0075163 A1 | 3/2015 | Frank et al. | |
| 2015/0096297 A1 | 4/2015 | Haraguchi et al. | |
| 2015/0096300 A1 | 4/2015 | Gurin | |
| 2016/0102631 A1 | 4/2016 | Lynn | |

* cited by examiner

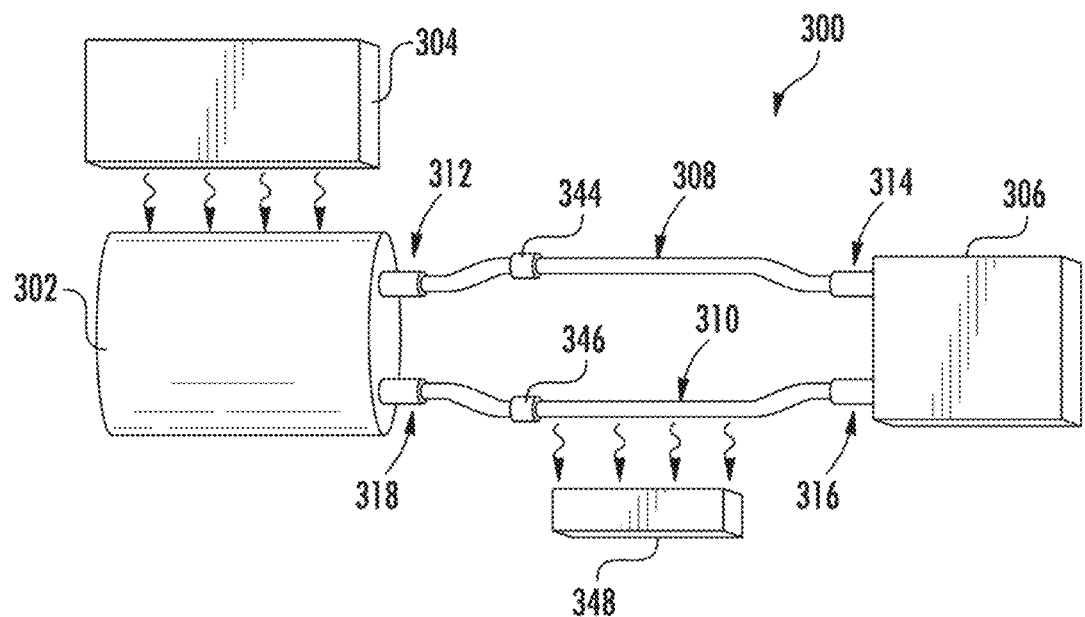
FIG. 7
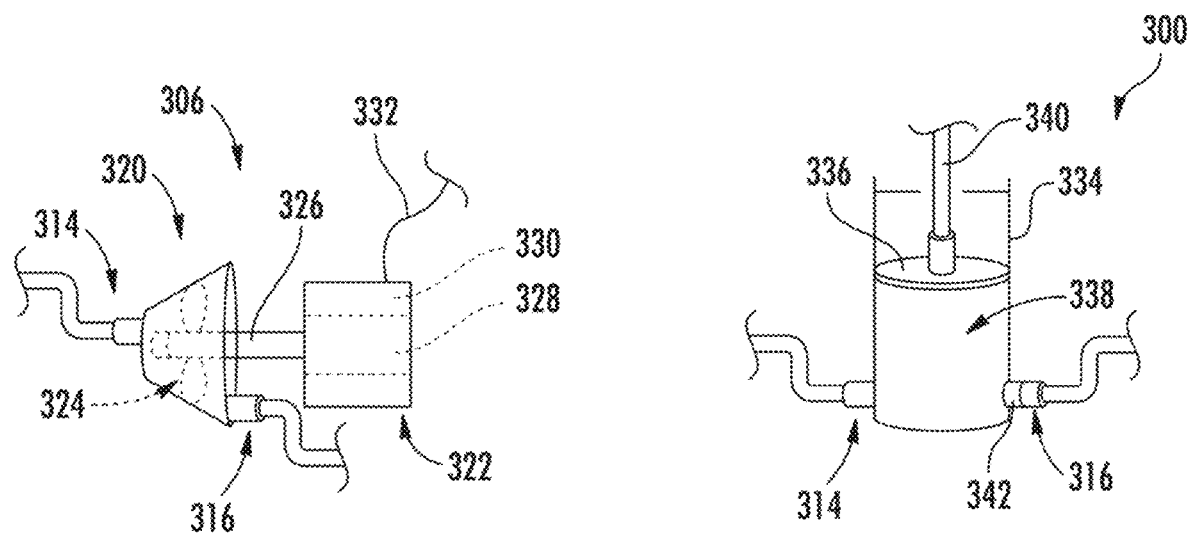
FIG. 8  FIG. 9

POWER GENERATING SYSTEM UTILIZING EXPANDING FLUID

RELATED APPLICATIONS

The present application is a Continuation in Part application claiming priority to U.S. patent application Ser. No. 16/376,354, filed Apr. 5, 2019, which is a Continuation Application claiming priority to U.S. patent application Ser. No. 15/589,410, filed on May 8, 2017, which is a Continuation in Part application claiming priority to U.S. patent application Ser. No. 14/629,606, filed Feb. 24, 2015, which is a Continuation Application claiming priority to U.S. patent application Ser. No. 14/193,087, filed on Feb. 28, 2014.

FIELD

The present disclosure relates generally to a system and method for extracting work from the expansion of a fluid.

BACKGROUND

Worldwide demand for energy, especially electrical energy, or electrical power, continues to grow. Domestic energy prices continue to rise and challenges arising from foreign political instabilities, especially with regard to fossil fuels like crude oil, brings uncertainty into future energy prices. At the same time, by certain accounts, known reserves of fossil fuels like crude oil are declining, and may not be renewed in the foreseeable future.

A percentage of the increased demand in electrical power may come from developing countries attempting to add people to community power supplies, as a measurable percentage of the world's population still lives without access to electrical power. This percentage may correlate closely in certain geographical regions with poverty, illiteracy, reduced life expectancy, infant mortality, unsafe drinking water, crop failure, water-borne diseases, and other negative consequences.

Further, throughout the world combustion engine-powered machines, such as motor vehicles, continuously attempt to achieve higher and higher efficiencies. With certain of these machines, hybrid electric designs have been proposed wherein at least a portion of the machine is run on electrical power. Particularly with hybrid electric motor vehicles, and wholly electric motor vehicles, challenges arise in maintaining an electric charge.

Accordingly, a system and method for extracting work inexpensively and without using additional fossil fuels would be useful. Particularly, such a system capable of extracting work inexpensively and without additional fossil fuels and without requiring complicated equipment will be especially beneficial.

Additionally, a system and method for extracting work in environments where some forms of heat transfer, such as convection, conduction, etc. are limited or unavailable can be beneficial. Additionally, the environments may not be conducive to some existing forms of work extraction, such as combustion (e.g., due to an absence of oxygen, exhaust capabilities, etc.). Particularly, a system that can extract useful work from thermal energy transferred by radiation (e.g., alone) can be beneficial.

SUMMARY

Aspects and advantages of the invention will be set forth in part in the following description, or may be obvious from the description, or may be learned through practice of the invention.

In one exemplary embodiment of the present disclosure, a system for extracting work from the expansion of a working fluid is provided. The system includes a vessel having at least a portion of the working fluid, a heating device in thermal communication with the portion of the working fluid in the vessel for heating the portion of the working fluid in the vessel and expanding the working fluid, and a conversion tool in fluid communication with the vessel configured to receive working fluid from the vessel when the working fluid expands. The conversion tool is further configured to extract work from the expanded working fluid.

In an exemplary aspect of the present disclosure, a method for extracting work from the expansion of a working fluid is provided. The method includes heating the working fluid in a vessel using a heating device to expand the working fluid in the vessel, and transferring at least a portion of the expanded working fluid to a conversion tool in fluid communication with the vessel. The method also includes extracting with the conversion tool work from the expanded working fluid from the vessel transferred to the conversion tool, and returning substantially all of the working fluid from the conversion tool to the vessel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a system for extracting work in accordance with another exemplary embodiment of the present disclosure.

FIG. 8 is a close-up view of a conversion tool of the exemplary system of FIG. 7 in accordance with an exemplary embodiment of the present disclosure.

FIG. 9 is a close-up view of a conversion tool of the exemplary system of FIG. 7 in accordance with another exemplary embodiment of the present disclosure.

DETAILED DESCRIPTION

Figure 1:
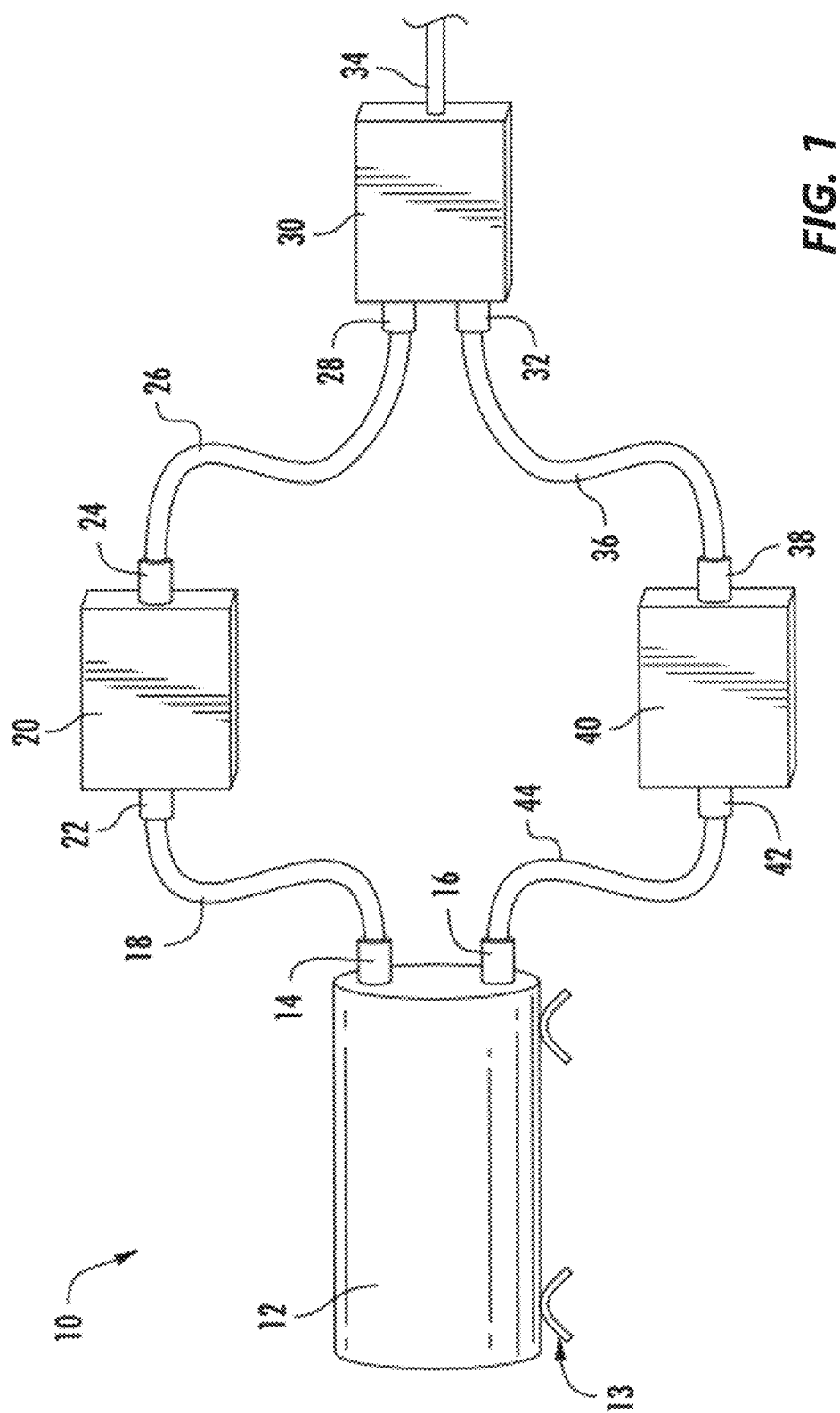
FIG. 1 provides diagrammatic view of a system for generating electrical power using expanding liquid in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is related generally to a system and method of extracting work using the expansion of a working fluid exposed to a heat source. More particularly, the present disclosure is related to a system and method of harnessing power generated from the expansion of a working fluid that is heated within a tank.

Referring now to the FIGS., FIG. 1 provides a diagrammatic view of an exemplary system 10 for generating power, such as electrical power, using an expansion of a working fluid when the working fluid is heated. For the embodiment depicted, the working fluid is a working liquid that remains in liquid form throughout the process. However, in other exemplary embodiments, the working fluid may instead be a phase change fluid that transforms at least partially between liquid phase and vapor phase during the extraction of work (see, e.g., FIGS. 7 through 21). More particularly, for the exemplary embodiment of FIG. 1, the system 10 generally includes a tank portion 15 (including a tank 12), an accumulator 20, a hydraulic generator 30, and a fluid reservoir 40. Although not pictured in the exemplary embodiment of FIG. 1, the system 10 may additionally include a heating device for heating the working liquid in the tank and a cooling device for cooling the working liquid in the tank (see FIGS. 2 through 5).

The tank 12 of FIG. 1 comprises the working liquid and defines an internal pressure. In certain embodiments, the working liquid in the tank 12 may take up all or substantially all of an internal volume of the tank 12. The tank 12 is mounted on a stand 13 and includes an outlet valve 14 fluidly connected to a first outgoing fluid line 18. The accumulator 20 includes an inlet valve 22 also fluidly connected to the fluid line 18. Accordingly, for the exemplary embodiment of FIG. 1, the tank 12 is fluidly connected to the accumulator 20.

The exemplary tank 12 of FIG. 1 may be comprised of any suitable material. For example, in certain exemplary embodiments, the tank 12 may be comprised of stainless steel, aluminum, tin, brass, iron, or any other suitable metal. Alternatively, in other exemplary embodiments, the tank may be comprised of any suitable plastic material such as an acrylonitrile butadiene styrene (ABS), polyethylene terephthalate (PET), high-density polyethylene (HDPE), polyvinyl chloride (PVC), polypropylene (PP), high impact polystyrene (HIPS), or any other suitable plastic. Additionally, in still other exemplary embodiments, the tank 12 may be comprised of a combination of the above materials, or any other suitable material. For example, the tank 12 may be comprised of a material configured to minimize an amount of thermal expansion of the tank 12.

It should also be appreciated that the exemplary tank 12 of FIG. 1 may be any suitable size or shape. For example, the tank 12 of FIG. 1 may be a relatively large tank, such as a 5,000 gallon tank, a 10,000 gallon tank, a 20,000 gallon tank, or even larger. Alternatively, the tank may be a relatively small tank, such as a 100 gallon tank, a 55 gallon tank, a 25 gallon tank, a 5 gallon tank, or even smaller. Further, the tank 12 may have any other size therebetween.

The system 10 may further include a plurality of tanks 12 in parallel connection or in series connection with the fluid line 18, the accumulator 20, and/or the generator 30. Further, the size, number, and construction of the tank(s) 12 may be optimized for the exemplary system 10 (i.e., for the accumulator 20, if provided, the hydraulic generator 30, and the various fluid lines and valves described herein).

Moreover, it should also be appreciated that as used herein the term "tank" refers to any suitable liquid-tight container that defines an approximately fixed volume. More particularly, tank as used herein refers to any container that is capable of withstanding an increased internal pressure from the expansion of a working liquid such that a portion of the working liquid is forced through the outlet valve 14. Accordingly, tank may refer to a rigid tank, or alternatively may refer to a semi-rigid tank or flexible tank.

Furthermore, the working liquid of the system 10 may be any suitable liquid configured to expand and retract. For example, the working liquid may in certain exemplary embodiments be water, a water solution, vegetable oil, motor oil, ammonia, or any other suitable liquid. The optimal working liquid used in the system 10 may be determined based at least in part on the availability, the coefficient of thermal expansion, the compressibility, the toxicity, the freezing temperature (and the expected temperature of the environment in which the system 10 is to be used), etc.

Referring still to FIG. 1, the accumulator 20 further includes an outlet valve 24 fluidly connected to an inlet valve 28 of the hydraulic generator 30 using the second outgoing fluid line 26. The accumulator 20 may be may be any device suitable for receiving and/or storing a portion of working liquid from fluid line 18 and the tank 12 and releasing a quantity of hydraulic fluid at a desired system pressure, flow rate, or both. For example, the accumulator 20 may be configured to receive and/or store working liquid when the internal pressure in the tank 12 and/or in the line 18 is above a minimum pressure threshold and then to release the hydraulic fluid at a constant pressure, a constant flow rate, or both through the fluid line 26 to the generator 30. Accordingly, as stated above, the number, size, and construction of the tank 12 may be optimized such that the working liquid transferred to the fluid line 18 from the tank 12 when the working liquid in the tank 12 expands is at a pressure that exceeds the minimum pressure threshold required for the accumulator 20.

For the exemplary embodiment of FIG. 1, the hydraulic fluid is the same as the working liquid. In other exemplary embodiments, however, the hydraulic fluid may be any other suitable hydraulic fluid. For example, in such an embodiment, the accumulator 20 may be configured to receive working liquid from the tank 12 and to transfer a hydraulic fluid having desired properties (such as non-compressibility, proper viscosity, low and/or high temperature fluidity, bio-degradability, low toxicity, etc.) to the hydraulic generator 30.

With continued reference to FIG. 1, the hydraulic generator 30 is also in communication with the fluid line 18 and the tank 12 through the accumulator 20. More particularly, for the exemplary embodiment of FIG. 1, the hydraulic generator 30 is in fluid communication with the accumulator 20 through fluid line 26, which is in fluid communication with the tank 12 through fluid line 18. The hydraulic generator 30 is configured to generate electrical power using the portion of working liquid that flows through fluid line 18 toward the generator 30. More particularly, the working liquid may rotate a turbine in the hydraulic generator 30 which may in turn be used for generating electrical power. For the exemplary embodiment of FIG. 1, the amount of energy generated may be optimized by the inclusion of the accumulator 20. For example, the hydraulic generator 30 may define an optimum pressure, speed, and/or flow rate or flow volume for generating electricity, and the accumulator 20 may be configured to provide the hydraulic fluid through the fluid line 26 at or near the optimum pressure, speed, and/or flow rate or flow volume.

Additionally, the hydraulic generator 30 is configured to transfer electrical power to, for example, a means for storing such electrical power, such as a battery pack, or to an electrical grid, or alternatively directly to, for example, a household or one or more electricity consuming device(s). An electrical output hose 34 is provided for such functionality.

The exemplary system 10 of FIG. 1 may therefore generate electricity when the temperature, and therefore the volume, of the working liquid in the tank 12 is increased, such that the internal pressure in the tank 12 is increased. In such a case, the internal pressure in the tank 12 may force a portion of the working liquid through the outlet valve 14 and through the fluid line 18 at a pressure that exceeds the minimum pressure threshold for the accumulator 20. Once the pressure in the accumulator 20 is above a predetermined threshold, the accumulator 20 may transfer the hydraulic fluid through the outlet valve 24 to the fluid line 26, and through the fluid line 26 to the inlet valve 28 of the generator 30, such that the generator 30 may generate electrical power, or electricity. Additionally, or alternatively, the outlet valve 14 may be a pressure relief valve, such that working liquid is not transferred from the tank 12 to the fluid line 18 until the pressure in the tank 12 exceeds an optimum threshold. The optimum threshold may be any pressure threshold determined to increase the efficiency of the exemplary system 10. For example, the optimum threshold may be equivalent to the minimum pressure threshold of the accumulator 20.

Referring still to the exemplary system 10 of FIG. 1, a first return fluid line 36 is provided in fluid communication with the hydraulic generator 30 and the tank 12. The return fluid line 36 is configured to return the hydraulic fluid, which for the exemplary embodiment of FIG. 1 is the same as the working liquid, to the tank 12 after flowing through the generator 30. More particularly, the first return fluid line 35 is fluidly connected to an outlet valve 32 of the hydraulic generator and an inlet valve 38 of the fluid reservoir 40. A second return fluid line 44 is also provided fluidly connected to the outlet valve 42 of the reservoir 40 and the inlet valve 16 of the tank 12. Accordingly, for the exemplary embodiment of FIG. 1, the hydraulic generator 30 is in fluid communication with the reservoir 40 and the reservoir 40 is in fluid communication with the tank 12.

The first return fluid line 36 may transfer working liquid from the generator 30 to the reservoir 40, and the second return fluid line 44 may return working liquid from the reservoir 40 to the tank 12. In certain exemplary embodiments, the working liquid in the reservoir 40 and fluid line 44 may be substantially at an atmospheric pressure. Therefore, the reservoir 40 is configured to provide working liquid to the tank 12 based at least in part on the internal pressure of the tank 12.

In certain exemplary embodiments, one or more of the valves provided in the exemplary system 10 may be one-way valves, or check valves, to ensure a proper fluid flow direction. For example, one or more of outlet valves 14, 24, 32, and 42 may be one-way valves only allowing the working liquid or other fluid to flow out of one or more of the tank 12, accumulator 20, generator 30, and reservoir 40, respectively. Similarly, one or more of inlet valves 16, 22, 28, and 38 may be one-way valves only allowing the working liquid or other fluid to flow into one or more of the tank 12, accumulator 20, generator 30, and reservoir 40, respectively.

Additionally, it should be appreciated, that the exemplary system 10 of FIG. 1 is provided by way of example only, and in other exemplary embodiments, the exemplary system 10 may have any other suitable configuration. For example, in other exemplary embodiments, the system 10 may not include the accumulator 20 (or fluid line 26) and the fluid line 18 may be directly connected to the inlet valve 28 of the generator 30. Similarly, in other exemplary embodiments, the system 10 may not include the reservoir 40 (or fluid line 44) and the fluid line 36 may be directly connected to the inlet valve 16 of the tank 12. Further, in still other exemplary embodiments, the reservoir 40 may instead be fluidly connected to the generator 30 and the accumulator 20. In such an exemplary embodiment, the hydraulic fluid may be a fluid other than the working liquid. Additionally, or alternatively, in yet another exemplary embodiment, the reservoir 40 may be fluidly connected to the accumulator 20 and the tank 12. In such an exemplary embodiment, the system 10 may include a plurality of reservoirs, and one or more additional fluid lines and valves as necessary.

Figure 2:
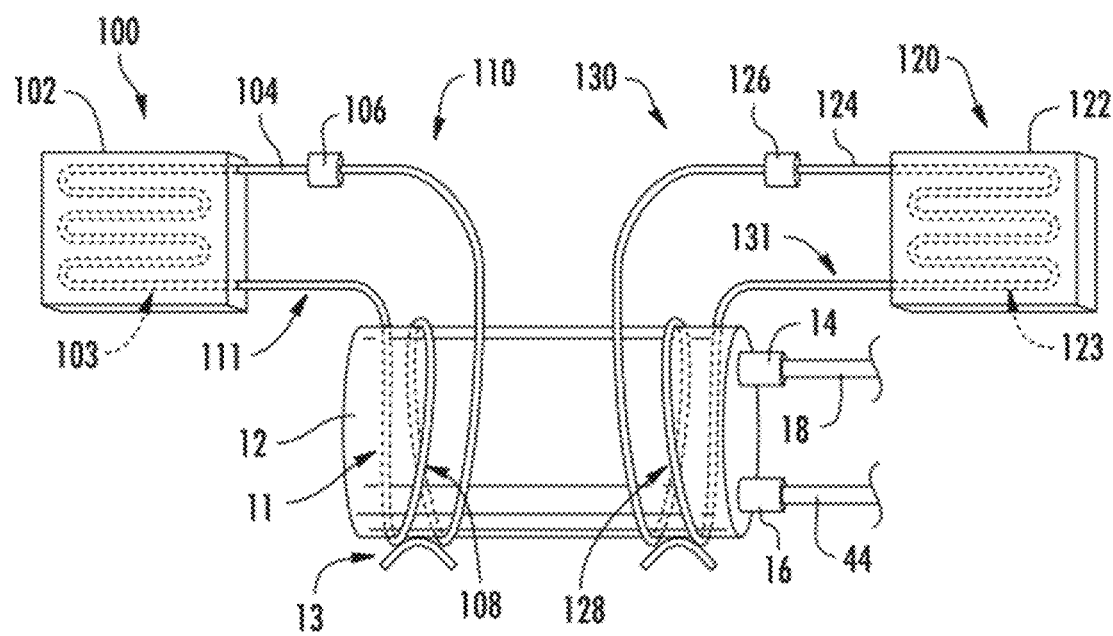
FIG. 2 provides diagrammatic view of a tank portion in accordance with an exemplary embodiment of the present disclosure.
Figure 3:
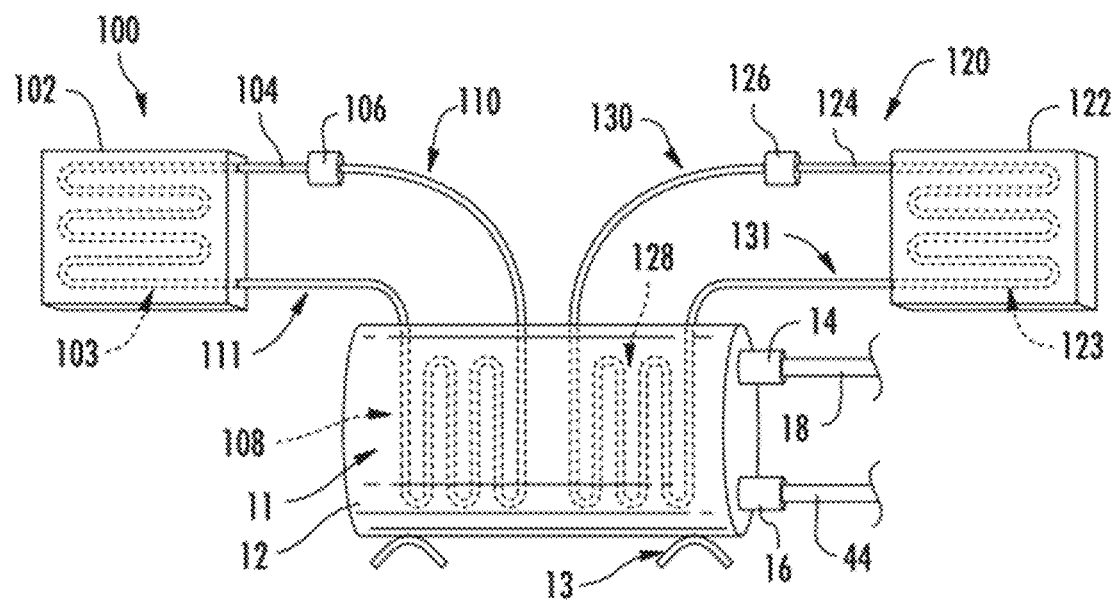
FIG. 3 provides diagrammatic view of another tank portion in accordance with another exemplary embodiment of the present disclosure.

With reference now to FIG. 2, a diagrammatic view of another embodiment of a tank portion 15 of the exemplary system 10 depicted in FIG. 1 is provided. More particularly, FIG. 2 provides a diagrammatic view of the tank 12 and working liquid in thermal communication with a heating device for heating the working liquid from a first temperature to a second temperature and a cooling device for cooling the working liquid from the second temperature to the first temperature. The heating device may heat the working liquid during a heating cycle and the cooling device may cool the working liquid during a cooling cycle.

For the exemplary embodiment of FIG. 2 the heating device for heating the working liquid comprises a heat collector system 100. The exemplary heat collector system 100 of FIG. 2 includes a heat collector 102 with a fluid line 104 including a thermal transfer fluid and defining a heat collecting portion 103. The fluid line 104 of the heat collector system 100 further defines transfer portions 110, 111 extending between the heat collector 102 and the tank 12 and a heat delivery portion 108 in thermal communication with the tank 12 and/or working liquid positioned therein. A pump 106 is provided to circulate the thermal transfer fluid within the fluid line 104 when the heat collector system 100 is activated, i.e., during a heating cycle. In certain exemplary embodiments, the pump 106 may be powered at least in part by the generator 30. Additionally, for the exemplary heat collector system 100 of FIG. 2, the heat delivery portion 108 of the fluid line 104 is wrapped around an outer surface 11 of the tank 12 such that it may transfer heat to the tank 12 and from the tank 12 to the working liquid positioned therein.

The heat collector 102 may be positioned in any suitable location to collect heat. For example, in certain exemplary embodiments the heat collector 102 may be positioned on or integrated into a surface or body that generally receives radiant thermal energy from the sun. For example, the heat collector 102 may be positioned on or integrated into a road or highway, a street sign, an exterior of a building (such as a wall, roof, or door of a building), an interior of a building heated by thermal energy (such as an attic, sunroom, or greenhouse), or a body of water (such as a lake or water tower). When the heat collector 102 is positioned in or adjacent to a body of water, the heat collector 102 may be positioned in or adjacent to a top end, or shallow part, of the body of water so as to collect heat from the warmest area of said body of water. Additionally, in other exemplary embodiments, the heat collector may be positioned on or in, or integrated into, any system generating waste heat. For example, the heat collector 102 may be positioned to collect waste heat from combustion processes, chemical processes, or manufacturing processes (such as in or proximate to cooling towers or other areas in a power plant); proximate to waste heat generated in a vehicle (such as between a radiator and an engine block, positioned in or proximate to or incorporated into an exhaust or turbocharger, incorporated into a supercharger, positioned proximate to one or more of the brakes, etc.); or in a storm water drain to collect heat from heated storm water draining off a road or highway. In still further exemplary embodiments, the heat collector 102 may be positioned in a vacuum environment, such as outer space, on the surface of the moon or other extraterrestrial body, in a spacecraft, etc. and configured to collect heat from solar or other forms of emitted radiant thermal energy, including in vacuum environments where other forms of heat collection (e.g., convective heat transfer) may be limited or impossible. For instance, the system 10 as described herein can be useful in producing electricity or other useful work in extraterrestrial environments, such as on Earth's Moon, satellites (e.g., the International Space Station, positioning system satellites, communications satellites, etc.), other planets, or other advantageous environments. In any of the above embodiments, the system 10 (including the tank 12) may be appropriately sized to operate proximate to the heat collector 102. Further, in still other embodiments, the heat collector 102 may be positioned to directly receive radiant thermal energy from the sun, either adjacent to the ground or in an above ground position, and may include one or more reflectors to concentrate the thermal energy from the sun on the heat collector. Moreover, in still other exemplary embodiments, the heat collector system 100 may additionally include a plurality of heat collectors 102 positioned in, on, or proximate to, or integrated into any suitable location.

The thermal transfer fluid in the fluid line 104 may be comprised of any suitable fluid for transferring thermal energy from the heat collector 102 to the tank 12 and/or the working liquid positioned therein. For example, in certain exemplary embodiments, the fluid may be a phase change fluid, or alternatively may be a single phase fluid. Suitable fluids include without limitation, refrigerants such as R-400 and R-500 hydrofluorocarbons blends, water, various oils, or air. Other fluids may be used as well.

Similarly, for the exemplary embodiment of FIG. 2, the cooling device for cooling the working liquid comprises a heat sink system 120. The exemplary heat sink system 120 of FIG. 2 includes a heat sink 122 and a fluid line 124 including a heat transfer fluid and defining a heat dispersing portion 123. The fluid line 124 of the heat sink system 120 further includes first and second heat transfer portions 130, 131 extending between the heat sink 122 and the tank 12 and a heat removal portion 128 in thermal communication with the tank 12 and/or the working liquid positioned therein. A pump 126 is provided to circulate the thermal transfer fluid within the fluid line 124 when the heat sink system 120 is activated, i.e., during a cooling cycle. In certain exemplary embodiments, the pump 126 may be powered at least in part by the generator 30. Additionally, for the exemplary heat sink system 120 of FIG. 2, the heat removal portion 128 of the fluid line 124 is wrapped around the outer surface 11 of the tank 12 such that it may remove heat from the tank 12 and/or from the working liquid positioned therein.

The heat sink 122 may be positioned in any suitable location to dissipate heat. For example, in certain exemplary embodiments the heat sink 122 may be positioned in a location shielded from the thermal energy from the sun. For example, the heat sink 122 may be positioned underground, such as buried underground, or underneath or adjacent to one or more structures such that it is positioned in the shade. Additionally, in other exemplary embodiments, the heat sink 122 may be positioned in or adjacent to a body of water. When, for example the heat collector 102 is also positioned in a body of water, the heat sink 122 may be positioned deeper in the same body of water such that it is surrounded by water having a lower temperature than the water surrounding the heat collector 102. For example, the heat collector 102 may be positioned at a top of a tank, such as at a top of a water tower, and the heat sink 122 may be positioned at a bottom of the tank, such as at a bottom of the water tower, or in any other suitable location. Additionally, or alternatively, the heat sink may be positioned downstream in a flow path of a dam, such that the heat sink 122 is exposed to the cool water at the bottom of the upstream body of water. It should be appreciated, however, that in still other exemplary embodiments, the heat sink 122 may be placed in any other suitable location to dissipate heat.

As with the heat collector system 100, the fluid line 124 in the heat sink system 120 may contain any suitable fluid for transferring thermal energy from the tank 12 and/or the working liquid positioned therein to the heat sink 122.

It should be appreciated, however, that the exemplary heat collector system 100 and heat sink system 120 of FIG. 2 is provided by way of example only, and other exemplary embodiments of the present disclosure, the systems 100, 120 may have any other suitable configuration. For example, in other exemplary embodiments, the heat delivery portion 108 of the heat collector system 100 and the heat removal portion 128 of the heat sink system 120 may have any other suitable configuration for delivering and removing heat, respectively, from the working liquid and/or the tank 12. For example, with reference to FIG. 3, another exemplary embodiment of the tank portion 15 of the system 10 of FIG. 1 is provided with an alternative embodiment of the heat collector system 100. In the exemplary heat collector system 100 of FIG. 3, the heat delivery portion 108 of the fluid line 104 and the heat removal portion 128 of the fluid line 124 are each positioned within the tank 12 to directly deliver heat to and remove heat from, respectively, the working liquid positioned within the tank 12. In other exemplary embodiments, however, the heat delivery portion 108 and heat removal portion 128 may have any other suitable configuration for being in thermal communication with the tank 12 and/or working liquid positioned therein.

Additionally, in still other exemplary embodiments of the present disclosure, the pumps 106 and 126 may be positioned anywhere within the respective systems 100 and 120. Further, the heat transfer portions 110, 111 and 130, 131 of the fluid lines 104, 124, respectively, may have any suitable configuration for transferring heat to and/or from the working liquid in the tank 12, and may in certain exemplary embodiments be insulated. Moreover, in yet another exemplary embodiment of the present disclosure, the system 10 may not include one or both of the heat collector system 100 and/or the heat sink system 122.

Figure 4A:
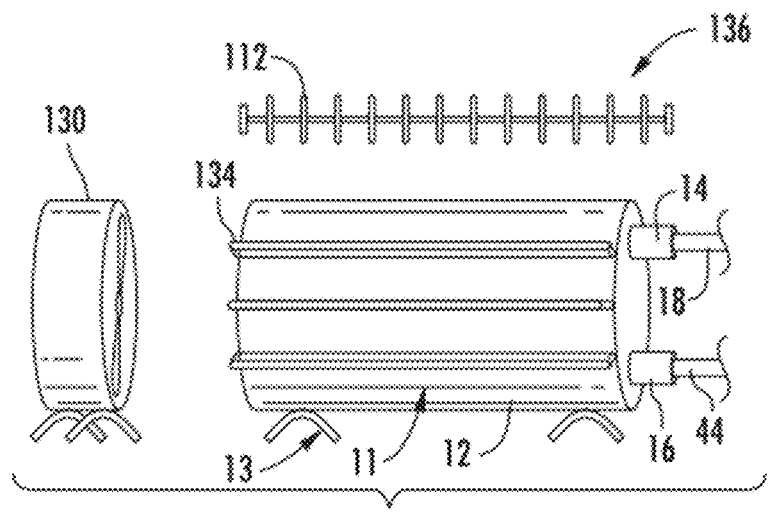
FIG. 4A provides diagrammatic view of yet another tank portion in accordance with yet another exemplary embodiment of the present disclosure, wherein the tank is being heated.
Figure 4B:
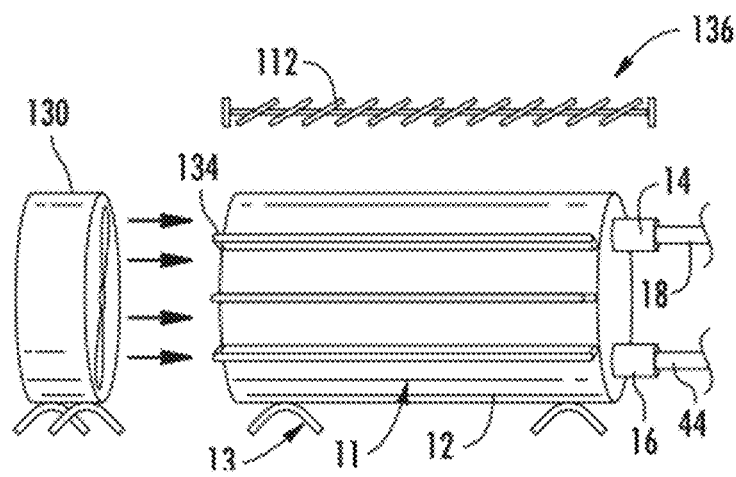
FIG. 4B provides diagrammatic view of the exemplary tank portion of FIG. 4A, wherein the tank is being cooled.

Referring now to FIGS. 4A and 4B, another exemplary embodiment of a tank portion 15 of the power generating system 10 of FIG. 1 is provided. As with the exemplary tank portions 15 of the power generating system 10 of FIGS. 2 and 3, the exemplary tank portion 15 of the power generating system 10 of FIGS. 4A and 4B includes a heating device for heating the tank 12 and/or the working liquid positioned therein and a cooling device for cooling the tank 12 and/or the working liquid positioned therein.

For the exemplary embodiment of FIGS. 4A and 4B, the tank portion 15 of the power generating system 10 includes a shading structure 136 having at least a portion positioned above the tank 12, such that the shading structure 136 includes a portion positioned between the tank 12 and radiant thermal energy from the sun. As shown the structure 136 includes a plurality of slats 112 moveable between an open position, as shown in FIG. 4A, and a closed position, as shown in FIG. 4B. Accordingly, when the slats 112 are in the open position, radiant thermal energy from the sun may heat the tank 12. Alternatively, when the slats 112 are in the closed position, radiant thermal energy from the sun is blocked from reaching the tank 12, such that the tank 12 is positioned in the shade. Accordingly, the shading structure 136 may be considered part of the heating device and the cooling device.

The heating device may further include a surface coating on the tank 12 to assist in the absorption of radiant energy from the sun to heat the tank and/or the working liquid positioned therein. For example, the surface coating may be a flat black paint coating. Notably, in certain exemplary embodiments, the surface coating may include any suitable advertising indicia or trademark indicia. The advertising and/or trademark indicia may be positioned for optimal viewing and may be comprised of a color and/or material to assist in the absorption of radiant energy from the sun.

The cooling device of the exemplary tank portion 15 of FIGS. 4A and 4B additionally includes a plurality of fins 134 on the tank 12 and a fan 130 configured to circulate air over and around the tank 12. The fins 134 of FIGS. 4A and 4B are fixed to the side of the tank 12, however, it should be appreciated that in other exemplary embodiments, the fins 134 may be removable, or alternatively may move between an extended and retracted position. The fan 130 may be powered at least in part by the generator 30.

A heating cycle of the exemplary tank portion 15 of FIGS. 4A and 4B is depicted in FIG. 4A, wherein the slats 112 of the shading structure 134 are in the open position such that radiant energy from the sun may pass therethrough and be absorbed by the tank 12 and the surface coating on an outer surface 11 of the tank 12. Moreover, a cooling cycle is depicted in FIG. 4B, wherein the slats 112 of the shading structure 134 are in the closed position, such that the tank 12 is shaded, and the fan 130 is operating to flow air over and/or around the tank 12 and fins 134 to cool the tank 12 and the working liquid therein.

Figure 5:
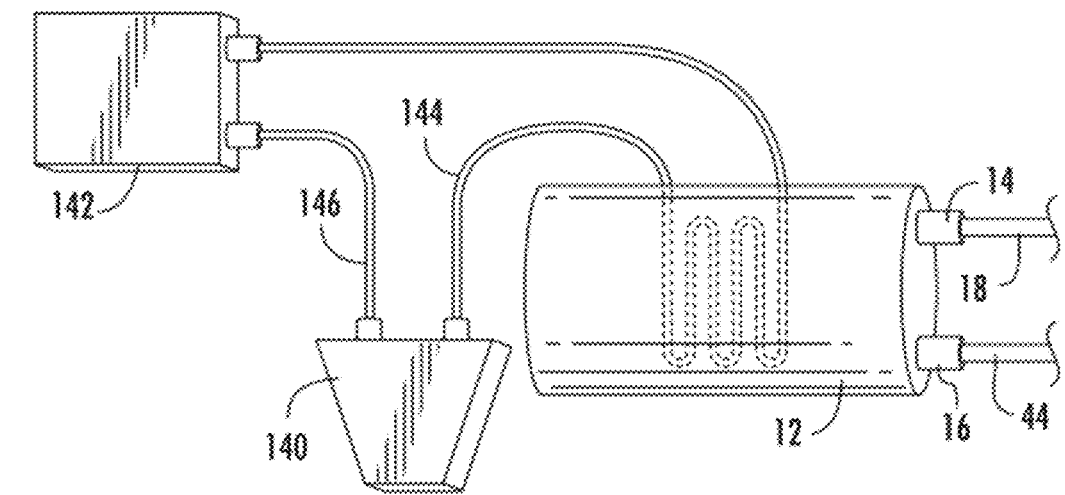
FIG. 5 provides a diagrammatic view of still another tank portion in accordance with still another exemplary embodiment of the present disclosure.

Referring now to FIG. 5, yet another exemplary embodiment of a tank portion 15 of the exemplary power generating system 10 of FIG. 1 is provided. The exemplary embodiment of FIG. 5 includes a heat collector system 100 incorporated into existing components of a cooling system of a vehicle. More particularly, the exemplary heat collector system 100 of FIG. 5 collects waste heat from an engine 140 positioned in the vehicle. During operation of the vehicle, the engine 140 generates heat (i.e., waste heat). Generally, coolant is pumped or otherwise directed to and through the engine 140 to capture some of the generated heat and cool the engine 140. The coolant is provided to the engine 140 through a hose 146. The hot coolant leaves the engine 140 through a hose 144 and the coolant may then be cooled by a radiator 142. The radiator 142 may then redirect the cooled coolant back to the engine 140 through the hose 146. In the exemplary embodiment of the heat collector system 100 of FIG. 5, however, the relatively hot coolant traveling through the hose 144 may transfer at least a portion of the captured waste heat from the engine 140 to the tank 12 or the working liquid positioned therein. The coolant may then return/continue to the radiator 142. The exemplary heat collector system 100 in the tank portion 15 depicted in FIG. 5 may improve the efficiency of the vehicle's cooling system by assisting in the removal of waste heat from the coolant, while also generating electricity.

It should be appreciated, however, that the exemplary embodiment of FIG. 5 is provided by way of example only. In other exemplary embodiments, the tank portion 15 may have any other suitable configuration. For example, in other exemplary embodiments, the tank portion 15 may further include a heat sink system in thermal communication with the tank 12. More particularly, the tank portion 15 may include the hose 146 containing relatively cool coolant in thermal communication with the tank 12 and/or the working liquid positioned therein. Alternatively, the tank portion 15 may include a heat sink system circulating relatively cool fluid from, e.g., a radiator overflow reservoir, windshield washer fluid from a windshield washer fluid reservoir, or even fuel from a fuel tank.

One having ordinary skill in the art will readily appreciate from the teachings herein that the exemplary system 10 of FIG. 1 and the various embodiments of the tank portion 15 of the power generating system 10 with heating and cooling devices depicted in FIGS. 2 through 5 may provide a method (200) for generating energy, such as electrical power, using the expansion of the working liquid in the tank 12. For example, in one exemplary aspect, the method (200) may include at (202) cooling the working liquid in the tank to a first temperature. In certain exemplary aspects, cooling the working liquid in the tank to the first temperature may be accomplished using a cooling cycle of a cooling device. The cooling device may be a heat sink system in thermal communication with the tank and/or the working liquid. However, in other exemplary aspects, any other suitable cooling device may be provided for cooling the working liquid in the tank. For example, the cooling device for cooling the working liquid may include a shading structure having closed configuration, a fan to circulate air over and around the tank, and/or fins on the tank. Alternatively, however, the cooling the working liquid at (202) may include allowing the tank to sit overnight without exposure to radiant thermal energy from the sun. In still further exemplary embodiments, the cooling the working liquid at (202) may be provided by temporary obstruction of radiated energy, such as solar energy, by revolution of a rotating shade, where the working liquid may be cooled by the absence of the blocked radiated energy.

As the working liquid in the tank cools, a volume of the working liquid in the tank, and an internal pressure in the tank, may decrease, pulling working liquid in the tank from a reservoir in fluid communication with the tank.

Additionally, the method (200) may include at (204) heating the working liquid in the tank to a second temperature. Heating the working liquid at (204) may increase a volume of the working liquid, such that an internal pressure of the tank increases. In certain exemplary aspects, heating the working liquid may be accomplished using a heating cycle of a heating device, such as a heat collector system in thermal communication with the tank and/or the working liquid. In such an exemplary aspect, heating the working liquid in the tank may include circulating a thermal transfer fluid through a fluid line in thermal communication with the tank and/or the working liquid using a pump. In still further exemplary embodiments, the heating the working liquid at (204) may be provided by temporary allowance of radiated energy, such as solar energy, by revolution of a rotating shade, where the working liquid may be heated by the incidence of the allowed radiated energy. It should be appreciated, however, in other exemplary aspects, the working liquid may be heated by any other suitable heating device.

The method (200) further includes at (206) transferring a portion of the working liquid from the tank through a fluid line in fluid communication with the tank using the increased internal pressure in the tank. In certain exemplary aspects, the fluid line may be directly connected to the tank, while in other embodiments, the fluid line may be connected to a valve that is in fluid communication with the tank. In such an exemplary aspect, the method (200) may further include transferring the working liquid from the tank through the valve and through the fluid line. Moreover, in such an exemplary aspect, the valve may be a one-way valve to ensure proper fluid flow.

Figure 6:
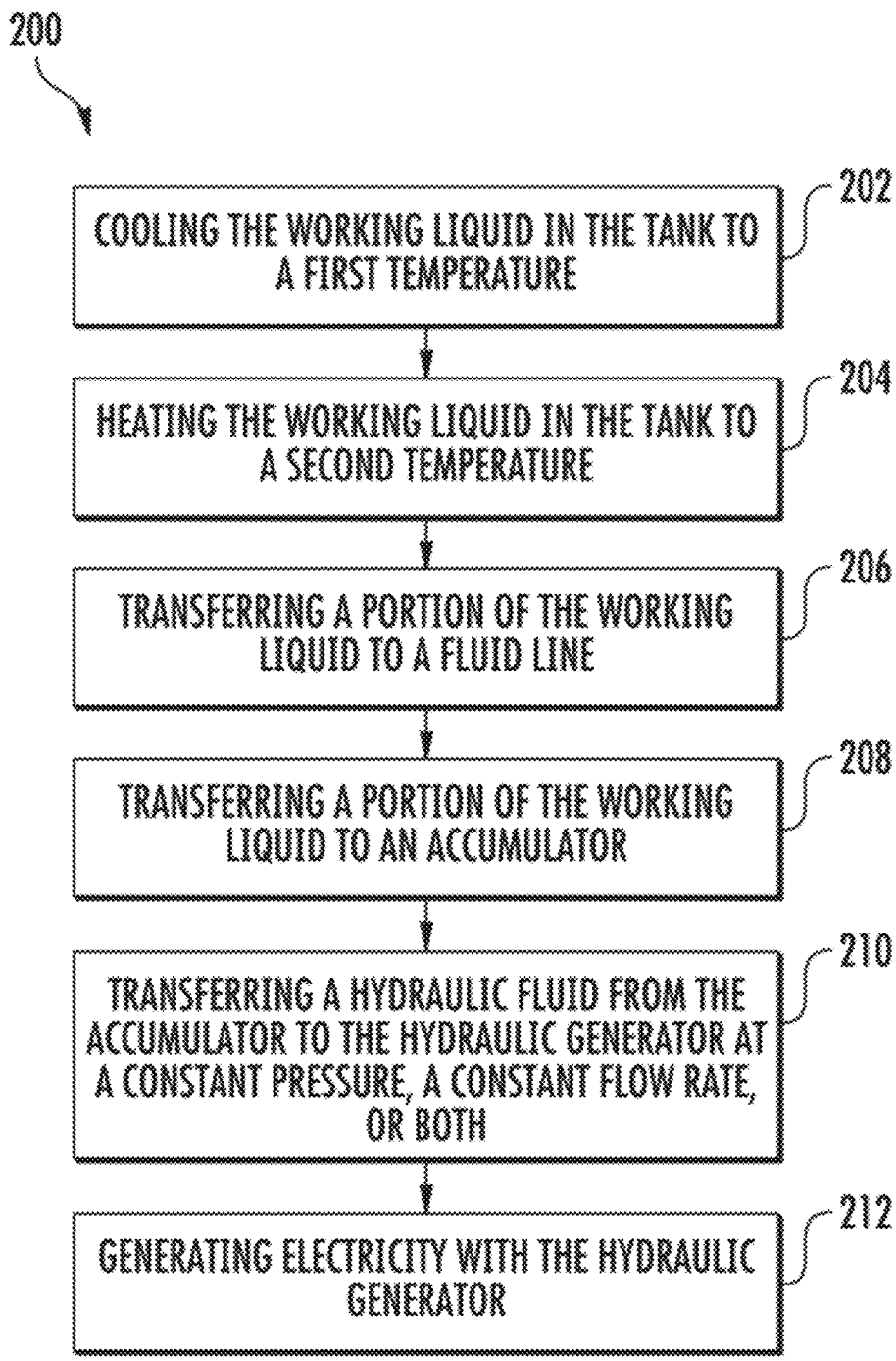
FIG. 6 provides a flow diagram of a method for generating electricity using expanding liquid in accordance with an exemplary aspect of the present disclosure.

Further, for the exemplary aspect of FIG. 6, the method (200) at (208) includes transferring a portion of the working liquid to an accumulator from the fluid line, at (210) transferring a hydraulic fluid from the accumulator to the hydraulic generator at a constant pressure, a constant flow rate, or both, and at (212) generating electricity with the hydraulic generator using the portion of working liquid transferred through the fluid line. More particularly, the portion of working liquid transferred through the fluid line may increase the pressure in the accumulator, such that the accumulator may transfer hydraulic fluid to the generator at (210).

It should be appreciated that in certain exemplary aspects, the hydraulic fluid transferred from the accumulator to the hydraulic generator may be the same as the working liquid, while in other exemplary aspects, the hydraulic fluid may be any other suitable fluid.

It should also be appreciated that in other exemplary aspects, the method (200) may not include transferring working liquid to the accumulator, and may instead include transferring the working liquid directly to the hydraulic generator through the fluid line. In such an exemplary aspect, the hydraulic generator may or may not include an internal accumulator.

In still other exemplary aspects, the method (200) may further include returning hydraulic fluid to the accumulator from the hydraulic generator using one or more fluid lines. Additionally, or alternatively, other exemplary aspects may include transferring hydraulic fluid from the generator to a reservoir and transferring working liquid from the reservoir to the tank. In such an exemplary aspect, the hydraulic fluid may be the same as the working liquid.

Referring now to FIG. 7, another exemplary embodiment of the present disclosure is depicted. More specifically, FIG. 7 depicts a system 300 for extracting work from the expansion of a working fluid in accordance with another exemplary embodiment of the present disclosure. Similar to the system 10 described above, the exemplary system 300 of FIG. 7 generally includes a vessel 302 including at least a portion of the working fluid and a heating device 304. The vessel 302 may be a rigid tank, such as is shown in the embodiment of FIG. 7, or alternatively, may be a rigid pipe, conduit, or any other suitable component for holding a volume of working fluid. The vessel 302 may accordingly be a rigid container defining a substantially constant interior volume (see, e.g., FIGS. 7, 10, 11), or alternatively may be a flexible container defining a variable interior volume (see, e.g., FIGS. 12-13). It will be appreciated, that as used herein the term "rigid" with respect to a vessel refers to a vessel that does not undergo any substantial elastic deformation during operation, and accordingly the internal volume does not fluctuate more than about ten percent during normal operation. By contrast, as used herein, the term "flexible" with respect to a vessel refers to a vessel that may undergo elastic deformation during operation and defines an internal volume that fluctuates more than ten percent during normal operation.

For the embodiment depicted, the heating device 304 is in thermal communication with the portion of the working fluid in the vessel 302 for heating the portion of the working fluid in the vessel 302 and expanding the portion of the working fluid in the vessel 302. As is depicted schematically, for the embodiment of FIG. 7, the heating device 304 is in indirect thermal communication with the portion of the working fluid in the vessel 302 for heating the portion of the working fluid in the vessel 302 and/or expanding the working fluid. For instance, as depicted in FIG. 7, the vessel 302 is mounted proximate the heating device 304, such that the heating device 304 may heat the portion of the working fluid in the vessel 302 through radiant heat energy. However, in other exemplary embodiments, the vessel 302 may be mounted directly to the heating device 304, such that the heating device 304 may heat the portion of the working fluid in the vessel 302 through conductive heat transfer (i.e., by transferring heat directly to the vessel 302, and the vessel 302 transferring heat to the working fluid), such that the heating device 304 can be placed in direct thermal communication with the portion of the working fluid in the vessel 302 for heating the portion of the working fluid in the vessel 302 and/or expanding the working fluid. Furthermore, in some other exemplary embodiments, heating device 304 may be positioned inside vessel 302, as described further herein. In certain exemplary embodiments, the heating device 304 may be configured in substantially the same manner as one or more of the exemplary heat collectors 102 or heat collector systems 100, described above with reference to FIGS. 1 through 5. Alternatively, however, in other exemplary embodiments, any other suitable heating device may be utilized with the exemplary system 300, such as in the same manner as one or more of the exemplary heating devices 304 described below. Additionally, or alternatively, the heating devices 304 may include lenses, mirrors, etc.

Further, by contrast to the previously discussed embodiments, for the embodiment depicted, the working fluid may be configured as a phase change fluid, such that the heating device 304 is configured to boil and vaporize at least a portion of the working fluid in the vessel 302. For example, in certain exemplary embodiments, the working fluid in the vessel 302 may have a vaporization temperature greater than about 40 degrees Fahrenheit and less than about 350 degrees Fahrenheit. For example, in certain exemplary aspects, the working fluid in the vessel 302 may have a vaporization temperature greater than about 50 degrees Fahrenheit, such as greater than about 75 degrees Fahrenheit, such as greater than about 100 degrees Fahrenheit, and less than about 300 degrees Fahrenheit, such as less than about 250 degrees Fahrenheit, such as less than about 200 degrees Fahrenheit. Further, the working fluid in the vessel 302 may define a relatively high volumetric coefficient of thermal expansion. For example, in certain exemplary embodiments, the working fluid in the vessel 302 may define a volumetric coefficient of thermal expansion between about $100/10^6$/Kelvin and about $2,000/10^6$/Kelvin, such as at least about $150/10^6$/Kelvin, such as at least about $200/10^6$/Kelvin, such as at least about $250/10^6$/Kelvin, such as up to about $1,800/10^6$/Kelvin, such as up to about $1,500/10^6$/Kelvin, such as up to about $1,300/10^6$/Kelvin, such as up to about $1,100/10^6$/Kelvin. Each of these volumetric coefficients of thermal expansion may be defined at twenty degrees Celsius.

In addition, the system 300 includes a conversion tool 306 in fluid communication with the vessel 302 configured to receive working fluid from the vessel 302 when the working fluid in the vessel 302 expands. The conversion tool 306 is further configured to extract work from the expanded working fluid received. More specifically, for the exemplary embodiment depicted in FIG. 7, the system 300 further includes a first fluid line assembly 308 fluidly connecting the vessel 302 to the conversion tool 306 for supplying expanded working fluid from the vessel 302 to the conversion tool 306, as well as a second fluid line assembly 310 fluidly connecting the conversion tool 306 back to the vessel 302 for returning working fluid from the conversion tool 306 to the vessel 302. Specifically for the embodiment depicted, the first fluid line assembly 308 fluidly connects an outlet 312 of the vessel 302 to an inlet 314 of the conversion tool 306, and the second fluid line assembly fluidly connects an outlet 316 of the conversion tool 306 to an inlet 318 of the vessel 302. The outlet 312 of the vessel 302, the inlet 314 of the conversion tool 306, the outlet 316 of the conversion tool 306, and the inlet 318 of the vessel 302 may each, e.g., be configured as, or include, an inlet/outlet connection or valve.

It will be appreciated that the exemplary system 300 described herein is a closed loop system substantially completely filled with the working fluid. Accordingly, during operation, the working fluid may circulate through the system using, e.g., thermosiphon principles.

In certain exemplary embodiments, in extracting work from the expanded working fluid, the conversion tool 306 is configured to generate electricity using the expanded working fluid, or is configured to provide a mechanical output force using the expanded work fluid.

For example, referring briefly to FIG. 8, an example embodiment of a conversion tool 306 as may be incorporated in the system 300 of FIG. 7 is provided. For the embodiment of FIG. 8, the conversion tool 306 is configured to generate electricity using the expanded working fluid from the vessel 302. More particularly, for the embodiment of FIG. 8, the conversion tool 306 generally includes a rotary section 320 and an electric generator 322, with the rotary section 320 defining the inlet 314 for receiving expanded working fluid from the first fluid line assembly 308 and the outlet 316 for providing the utilized expanded working fluid to the second fluid line assembly 310. For the embodiment depicted, the expanded working fluid provided through the inlet 314 of the rotary section 320 flows across an impeller 324 to the outlet 316, rotating the impeller 324. The impeller 324 is coupled to a shaft 326, which in turn rotates the electric generator 322. More particularly, the exemplary electric generator 322 depicted includes a rotor 328 coupled to the shaft 326 and a stator 330. The relative movement the rotor 328 and stator 330 may generate electricity, which may be provided from the system 300 using an electric line 332.

It will be appreciated, however, that in other exemplary embodiments, any other suitable conversion tool 306 may be provided for generating electricity from the expanded working fluid. For example, in other exemplary embodiments, any other suitable rotary section 320 may be utilized, such as an expansion turbine. Additionally, in other exemplary embodiments, any other suitable configuration of the electric generator 322 may be provided.

Further, in other exemplary embodiments, the conversion tool 306 may instead be configured to provide a mechanical output force using the expanded working fluid. For example, referring now briefly to FIG. 9, a conversion tool 306 is provided in accordance with another exemplary embodiment of the present disclosure as may be incorporated into the system 300 of FIG. 7. The exemplary conversion tool 306 of FIG. 9 is generally configured as a piston. More specifically, the piston includes a cylindrical body 334 with a plunger 336 movably positioned therein. At least a portion of the body 334 and the plunger 336 defines an expansion cavity 338, with the body 334 defining the inlet 314 and the outlet 316. Particularly, for the embodiment depicted, the inlet 314 and outlet 316 are fluidly connected to the expansion cavity 338. During operation, expanded working fluid may flow from the first fluid line assembly 308 to the expansion cavity 338 through the inlet 314 to increase a pressure in the expansion cavity 338, forcing the plunger 336 outward. Movement of the plunger 336 may correspondingly move a rod 340 of the exemplary conversion tool 306, which may provide a mechanical output force using the expanded working fluid.

The outlet 316 of the conversion tool 306 is selectively fluidly connected to the second fluid line assembly 310. More particularly, the conversion tool 306 includes a valve 342 movable between an open position and a closed position to selectively fluidly connect the second fluid line assembly 310 to the expansion cavity 338 of the piston. The valve 342 may be moved to the open position to release a pressure in the piston after a desired amount of mechanical output force is provided, and provide the utilized working fluid to the second fluid line assembly 310. The valve 342 may be manually actuated, or alternatively may be operably coupled to a suitable controller. It should be appreciated, however, that in other exemplary embodiments, any other suitable conversion tool 306 may be provided for providing mechanical output force using the expanded working fluid. For example, in other exemplary embodiments, the conversion tool 306 may include a lever, a suitable expansion bag, or other tool for utilizing the expanding working fluid in providing a mechanical output force.

Referring back to FIG. 7, it will be appreciated that for the embodiment depicted, the first fluid line assembly 308 includes a pressure valve 344 therein at a location upstream of the conversion tool 306. The pressure valve 344 may define a minimum baseline flow-through pressure, such that the expanded working fluid must reach the minimum baseline flow-through pressure prior to flowing therethrough. The "pressure valve" 344 may be any valve that allows for a flow of fluid above a minimum baseline pressure, and accordingly, may also be referred to as a "pressure relief valve". In addition, for the embodiment depicted, the second fluid line assembly 310 includes a one-way check valve 346 positioned therein at a location upstream of the vessel 302. The one-way check valve 346 may ensure that the working fluid from the vessel 302 does not flow through the second fluid line assembly 310 to, or towards, the conversion tool 306. Notably, however, in other exemplary embodiments, the vessel 102 may include the pressure valve 344 at the outlet 312 of the vessel 102, and further may include the one-way check valve 346 at the inlet 318 of the vessel 102. Alternatively, in still other exemplary embodiments, the conversion tool 306 may include the pressure valve 344 at the inlet 314 of the conversion tool, and further may include the one-way check valve 346 at the outlet 316 of the conversion 306.

Moreover, for the embodiment of FIG. 7, the first fluid line assembly 308 extends from the vessel 302 to the conversion tool 306 such that the conversion tool 306 is fluidly connected to the vessel 302 directly through the first fluid line assembly 308. More specifically, the first fluid line assembly 308 is directly fluidly connected to the vessel 302 through the outlet 312 of the vessel 302, and is further directly fluidly connected to the conversion tool 306 at the inlet 314 of the conversion tool 306. Similarly, the second fluid line assembly 310 extends from the conversion tool 306 back to the vessel 302 such that the vessel 302 is fluidly connected to the conversion tool 306 directly through the second fluid line assembly 310. More specifically, the second fluid line assembly 310 is directly fluidly connected to the conversion tool 306 through the outlet 316 of the conversion tool 306, and is further directly fluidly connected to the vessel 302 at the inlet 318 of the vessel 302. It will be appreciated that in certain exemplary embodiments, the first fluid line assembly 308, the second fluid line assembly 310, or both may include a plurality of different fluid lines forming the respective fluid line assembly, with, e.g., valves, fluid line connectors, or joints positioned therein. However, the first fluid line assembly 308 and second fluid line assembly 310 each do not include distinct reservoirs or other cavities, etc. Such a configuration may assist with providing the working fluid directly between the vessel 302 and the conversion tool 306, while simplifying the system 300 and without requiring other unnecessary components.

Moreover, the exemplary system 300 depicted in FIG. 7 additionally includes a heat sink 348, with the second fluid line assembly 310 thermally connected to the heat sink 348. In such a manner, the working fluid within the second fluid line assembly 310 may be cooled as it is transferred from the conversion tool 306 back to the vessel 302, such that relatively cool working fluid is provided back to the vessel 302. The heat sink 348 may be configured as one or more the exemplary cooling devices and heat sink systems 122 described above with reference to FIGS. 1 through 5. Additionally, however, in other exemplary embodiments, the exemplary system 300 may include any other suitable heat sink 348, or other suitable means for reducing a temperature of the working fluid through the second fluid line assembly 310.

Additionally, it should be appreciated that in certain exemplary embodiments, the first fluid line assembly 308 and second fluid line assembly 310 may be constructed to increase an efficiency of the exemplary system 300. For example, in certain exemplary aspects, at least a portion (or a substantial portion) of the first fluid line assembly 308 may be insulated such that any vaporized working fluid flowing therethrough maintains a desired temperature and pressure. By contrast, in certain exemplary aspects, at least a portion (or a substantial portion) of the second fluid line assembly 310 may be formed to allow for a relatively large amount of heat transfer with its surroundings (e.g., to a heat sink). For example, in certain exemplary embodiments, the first fluid line assembly 308 may be formed substantially of a first material defining a first thermal conductivity, while the second fluid line assembly 310 may be formed substantially of a second material defining a second thermal conductivity. The second thermal conductivity may be at least about 50 percent greater than the first thermal conductivity, such as at least about 75 percent greater, such as at least about 100 percent greater, such as at least about 200 percent greater, such as up to about 2,000 percent greater (each when measured in "Btu/Foot-Hour-Fahrenheit" at about 75 degrees Fahrenheit). By way of example only, in at least certain exemplary embodiments, the first material may include a foamed insulation material having a thermal conductivity of about 0.017 (Btu/Foot-Hour-Fahrenheit), while the second material may be a copper material, such as a copper pipe, having a thermal conductivity of about 230 (Btu/Foot-Hour-Fahrenheit), each at about 75 degrees Fahrenheit.

Notably, in such a manner, the system 300 for extracting work from the expansion of the working fluid may substantially continuously extract work using the conversion tool 306. For example, as stated above, in at least certain exemplary aspects, the working fluid may be a phase change fluid. The heating device 304 in thermal communication with the portion of the working fluid in the vessel 302 may heat such working fluid in the vessel 302, vaporizing the working fluid in the vessel 302. The vaporized/expanded working fluid may exit the vessel 302 through the outlet 312 of the vessel 302, and flow into the first fluid line assembly 308. It will be appreciated, however, that depending on the design of the particular embodiment, the working fluid may additionally, or alternatively, expand and/or vaporize as it leaves the vessel 302 or in the first fluid line assembly 308. The vaporized/expanded working fluid may then pass through the pressure valve 344, i.e., once a pressure of the vaporized/expanded working fluid in the first fluid line exceeds the minimum baseline flow-through pressure, and flow to the inlet 314 of the conversion tool 306. Once in the conversion tool 306, the vaporized/expanded working fluid may be utilized to generate work, such as electricity (e.g., FIG. 8) or a mechanical output force (e.g., FIG. 9). The working fluid may then exit the conversion tool 306 through the outlet 316 of the conversion tool 306, where it flows through the second fluid line assembly 310 back towards the vessel 302. The heat sink 348 may cool the vaporized/expanded working fluid below the vaporization temperature for the working fluid, condensing the working fluid back to a liquid. The liquid working fluid may then be provided back to the vessel 302 through the inlet 318 of the vessel 302, wherein the heating device 304 may re-heat the working fluid and repeat the process.

It will be appreciated that the exemplary system 300 described above with reference to FIG. 7 may be utilized in a variety of scenarios for a multitude of different purposes. For example, as discussed, the system 300 may be utilized with any suitable heating device 304 and any suitable heat sink 348. Further, the system 300 may be scaled up or scaled down based on a desired amount of work needed from the system 300, an amount of heat provided from the heating device 304, and/or an efficiency of the heat sink 348.

Additionally, it should be appreciated that in other exemplary embodiments, any other suitable vessel 302 may be utilized with the system 300. For example, referring now generally to FIGS. 10 through 13, various other embodiments of vessels 302 as may be incorporated into a system 300 in accordance with one or more exemplary embodiments of the present disclosure are provided.

Figure 10:
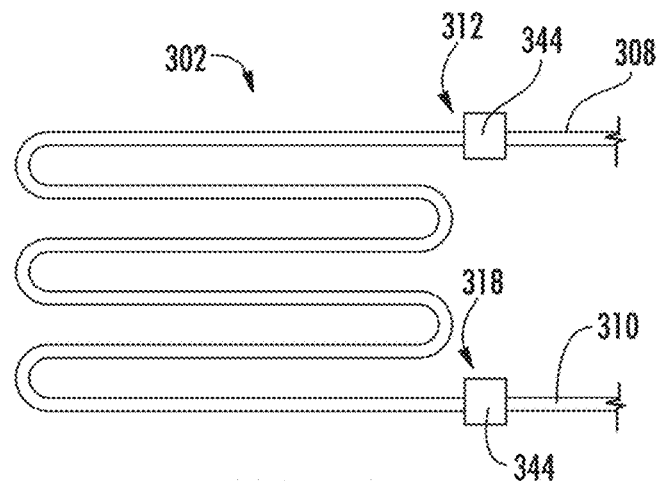
FIG. 10 is a schematic view of a vessel as may be incorporated in a system for extracting work in accordance with an exemplary embodiment of the present disclosure.

Referring first to FIG. 10, the exemplary vessel 302 depicted is generally configured as a length of conduit, the conduit extending between a first end and a second end. An outlet 312 of the vessel 302 is at the first end of the conduit and an inlet 318 of the vessel 302 is at the second end of the conduit. Additionally, for the embodiment depicted, the vessel 302 is connected to the first fluid line assembly 308 through a pressure valve 344, and further is connected to the second fluid line assembly 310 through a one-way check valve 346. Notably, however, in other exemplary embodiments, the vessel may be formed integrally with a portion of the first fluid line assembly 308 and/or the second fluid line assembly 310. Further, the conduit may be a rigid conduit formed, e.g., of a material with a relatively high heat transfer coefficient, such as copper.

Figure 11:
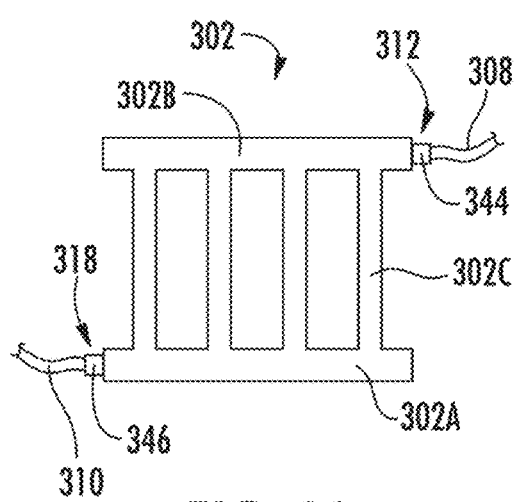
FIG. 11 is a schematic view of a vessel as may be incorporated in a system for extracting work in accordance with another exemplary embodiment of the present disclosure.

Similarly, referring now to FIG. 11, the vessel 302 is not configured with one main opening, and instead is configured as a first reservoir section 302A, a second reservoir section 302B, and a plurality of fluid connection members 302C extending therebetween. It will be appreciated that the vessel 302 may include any suitable number of fluid connection members 302C extending between the first reservoir section 302A and second reservoir section 302B. The exemplary vessel 302 of FIG. 11 may also be a substantially rigid vessel.

Figure 12:
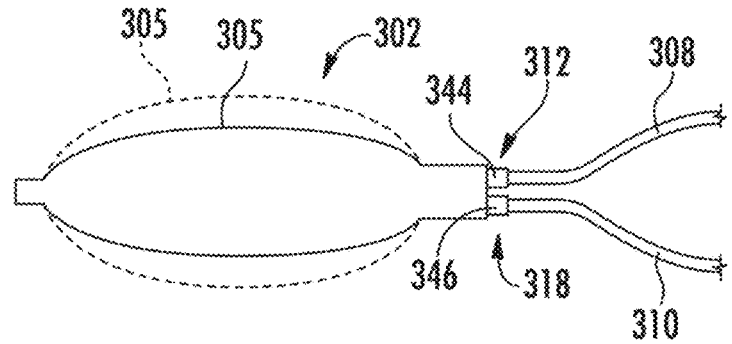
FIG. 12 is a schematic view of a vessel as may be incorporated in a system for extracting work in accordance with yet another exemplary embodiment of the present disclosure.

Further, referring now to FIG. 12, the vessel 302 may not be configured as a rigid container, and instead may configured as a flexible container. For example, as is depicted, the vessel 302 includes an outer wall 305. The outer wall 305 is configured to expand as an internal pressure within the vessel 302 of FIG. 12 increases. For example, the vessel 302 is depicted in a condition in which the internal pressure of the vessel 302 is relatively low. When the internal pressure of the vessel 302 is increased, the outer wall 305 expands such that an interior volume of the vessel 302 increases (as is depicted in phantom). Notably, the outer wall 305 of such a vessel may be formed of an elastic or elastomeric material, such that it is biased towards the first condition, i.e., wherein the vessel 302 defines a relatively low internal volume. Such may allow the working fluid to be provided through the outlet 312 at a more consistent pressure and/or rate.

Figure 13:
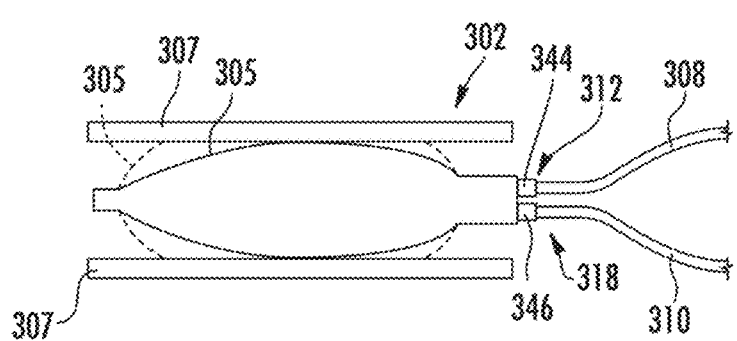
FIG. 13 is a schematic view of a vessel as may be incorporated in a system for extracting work in accordance with still another exemplary embodiment of the present disclosure.

Moreover, referring now to FIG. 13, a vessel 302 in accordance with yet another exemplary embodiment of the present disclosure is depicted. The vessel 302 of FIG. 13 is similar to the exemplary vessel described above with reference to FIG. 12. However, for the embodiment of FIG. 13, the vessel 302 is positioned between opposing rigid plates 307. The rigid plates 307 may be fixed in position relative to one another, e.g., through one or more brackets (not shown). The rigid plates may assist with providing heated working fluid through the outlet 312 to the first fluid line assembly 308 by limiting an amount the vessel 302 may expand. Additionally, in certain exemplary embodiments, one or both of the rigid plates 307 may be configured as a heating device 304. For example, in certain exemplary embodiments, one or both of the rigid plates 307 may be positioned to receive thermal energy from e.g., the sun, and further to transfer such thermal energy to the working fluid within the vessel 302. With such an exemplary embodiment, one or both of the rigid plates 307 may be painted a dark color, such as a black, such as a flat black, in order to maximize an amount of thermal energy received from the sun. Additionally, with such an exemplary embodiment, one or both of the rigid plates 307 may include one or more thermal features, such as one or more fins, to further increase an amount of thermal energy received.

As mentioned above, one potential application for the exemplary system 300 of FIG. 7 is integrated into a motor vehicle 350. For example, referring now to FIG. 14, an exemplary motor vehicle 350 within which the system 300 of FIG. 7 may be incorporated is provided. As is depicted schematically, the exemplary motor vehicle 350 includes a combustion engine 352, which may be configured to receive fuel, and ignite such fuel to generate a rotational force which may be transferred through, e.g., one or more driveshafts, axles, etc. (not shown) to the wheels 354 to drive the motor vehicle 350. As will be appreciated, the combustion engine 352 may generate a relatively high amount of heat during operation by virtue of the combustion. Accordingly, the motor vehicle 350 further includes a radiator 356 which, through one or more fluid lines (see FIG. 15, below), is thermally connected to the combustion engine 352 to maintain a temperature in the combustion engine 352 within a desired operating temperature range. Further, an exhaust system 358 is provided. The exhaust system 358 may carry combustion gases from the combustion engine 352 to, e.g., a rear the motor vehicle 350 to atmosphere, exhausting such combustion gasses. Although not depicted, the motor vehicle 350 may further include a plurality of brakes for slowing rotation of the plurality of wheels 354, as is known.

Moreover, for the embodiment depicted, the motor vehicle 350 is configured as a hybrid electric motor vehicle 350, and accordingly further includes an electric motor 360 for assisting with generating a rotational force which may be transferred to the wheels 354. The motor vehicle 350 may be ganged with an output shaft (not shown) of the combustion engine 352 such that the electric motor 360 and combustion engine 352 may together provide the rotational force that is transferred through the one or more driveshafts, axles, etc. (not shown) to the wheels 354. In order to power the electric motor 360, the motor vehicle 350 further includes an electric energy storage unit 362 and a charging assembly 364. The electric energy storage unit 362 may be a plurality of batteries, capacitors, or other suitable devices for storing electrical power. Additionally, the charging assembly 364, for the embodiment depicted, includes an electric extension cord 366 which may be connected to, e.g., a home power grid, for charging the electric energy storage unit 362. Moreover, the motor vehicle 350 includes power electronics 368, with the electric energy storage unit 362 electrically connected to the electric motor 360 through the power electronics 368. The power electronics 368 may be configured to condition or transform the electric power from the electric energy storage unit 362 in a desired manner for the electric motor 360.

Furthermore, it will be appreciated, that the exemplary motor vehicle 350 further includes a plurality of exterior panels 365. For example, although not labeled, it will be appreciated that the plurality of exterior panels 365 includes a roof panel, a trunk panel, door panels, quarter panels, a hood panel, etc. The exterior panels 365 may be directly exposed to an ambient environment of the motor vehicle 350 (e.g., the sun).

Figure 14:
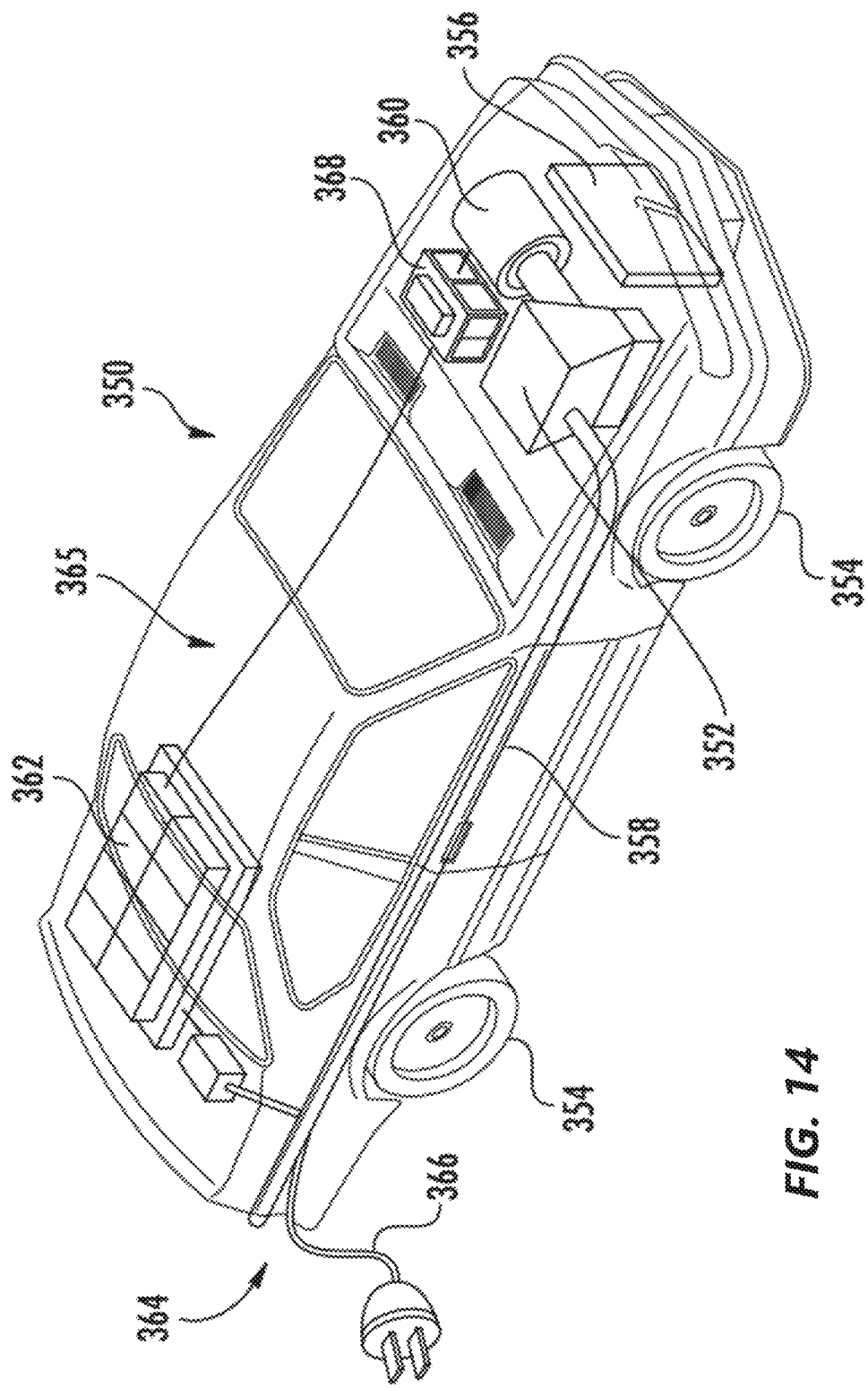
FIG. 14 is a schematic view of a motor vehicle in accordance with an exemplary embodiment of the present disclosure.
Figure 15:
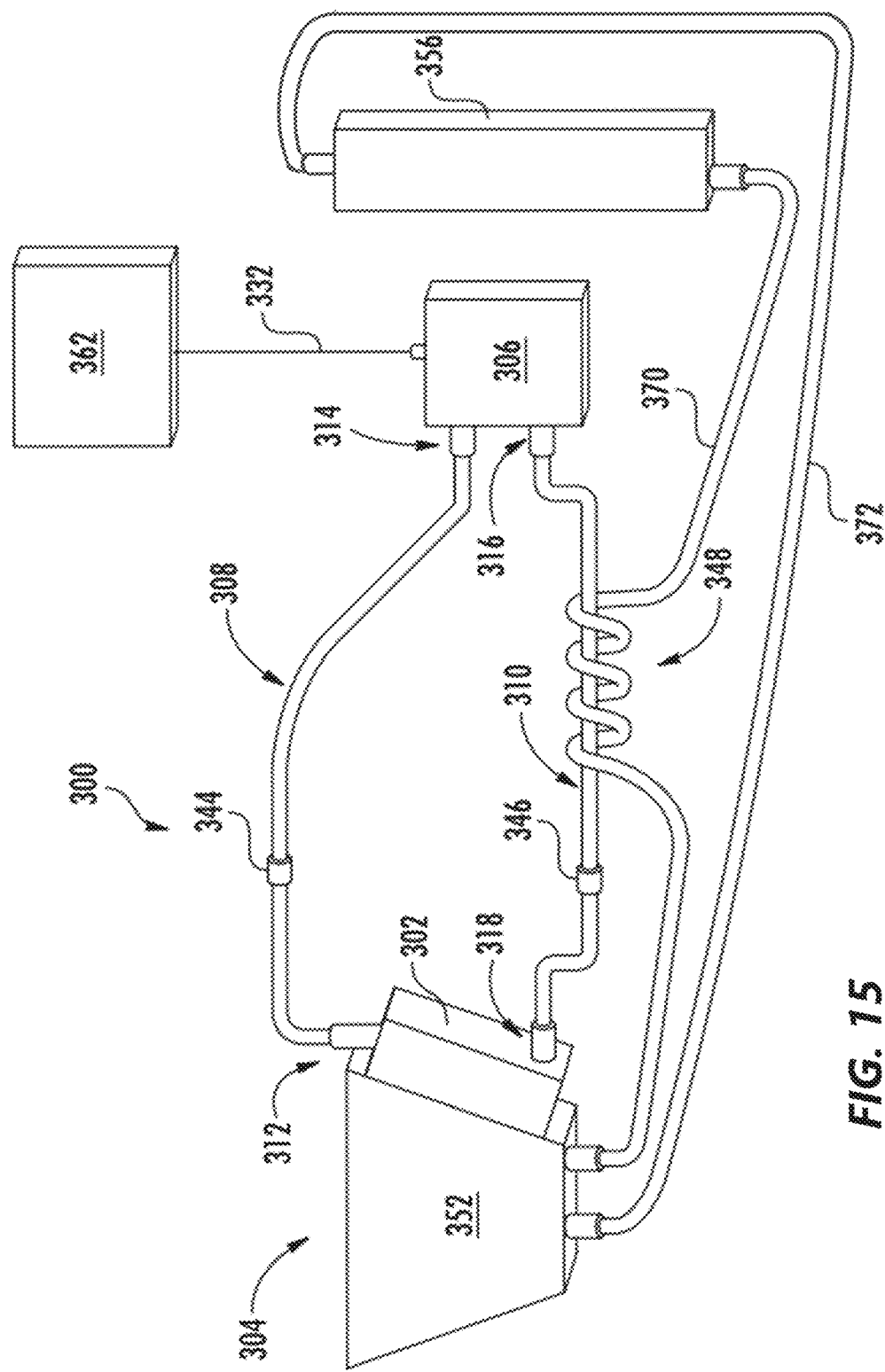
FIG. 15 is a schematic view of a system for extracting work in accordance with another exemplary embodiment of the present disclosure, as may be incorporated in the exemplary motor vehicle of FIG. 14.
Figure 16:
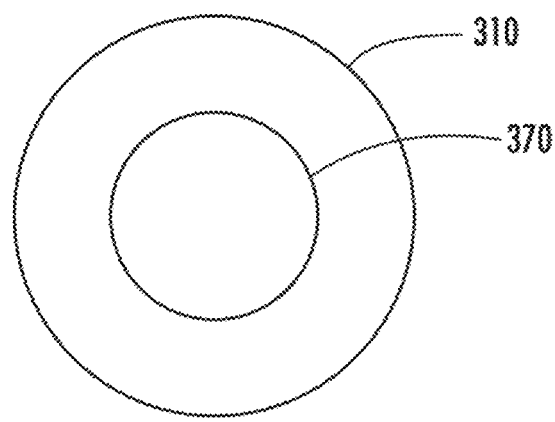
FIG. 16 is a schematic cross-sectional view of a hose assembly in accordance with an exemplary aspect of the present disclosure.

Referring now to FIG. 15, a schematic view of a system 300 for extracting work from the expansion of a working fluid as may be integrated into the exemplary motor vehicle 350 of FIG. 14 is provided. The exemplary system 300 of FIG. 15 may be configured in substantially the same manner as exemplary system 300 described above with reference to FIG. 7. For example, the exemplary system 300 of FIG. 15 generally includes a vessel 302 having at least a portion of the working fluid positioned therein, a heating device 304 in thermal communication with the portion of the working fluid in the vessel 302, a first fluid line assembly 308, a second fluid line assembly 310, a conversion tool 306 fluidly connected to the vessel 302 through the first fluid line assembly 308 and the second fluid line assembly 310, and a heat sink 348 in thermal communication with the second fluid line assembly 310.

For the embodiment depicted in FIG. 15, the heating device 304 is a first component of the motor vehicle 350 (FIG. 14) and the vessel 302 is a rigid tank mounted in thermal communication with the first component. In some implementations on motor vehicles, the heating device 304 may be provided indirectly by vehicle exhaust gasses or other combustion products or vehicle systems (e.g., antifreeze) without direct exposure to the working fluid. Additionally and/or alternatively, in some implementations on motor vehicles, the heating device may include vehicle exhaust gasses that are not in direct fluid communication with the working fluid. For instance, in some other implementations on motor vehicles, the heating device 304 may be provided by a manner other than vehicle exhaust gasses mixed with the working fluid. In some implementations, byproduct heat from combustion (e.g., heat from exhaust gasses) may be transferred to the working fluid. This heat transfer may occur without direct fluid communication, such as by conduction between the exhaust gasses and the working fluid through a separating body (e.g., a vehicle tailpipe or other vehicle component, a wall of the vessel 302, etc.). As one example, a portion of the system 300 (e.g., the vessel 302) may be mounted or otherwise in thermal communication (e.g., direct thermal communication) with a portion of a combustion engine (e.g., a tailpipe) having heat resulting from combustion such that the vessel 302 receives the heat from combustion through conductive heat transfer, without direct exposure of working fluid in the vessel 302 to combustion products (e.g., exhaust). In some implementations, the system 300 can be configured to function independently of vehicle exhaust gasses.

More specifically, for the embodiment of FIG. 15, and referring to components depicted in FIG. 14, the first component is at least one of a combustion engine 352, an exhaust 358, the brakes (not illustrated) of the motor vehicle 350, such as brakes of wheel 354, or an exterior panel 365 of the motor vehicle 350, and more specifically still, is the combustion engine 352 of the motor vehicle 350. Moreover, the vessel 302 is mounted directly to the combustion engine 352 for the embodiment depicted in FIG. 15, such that the combustion engine 352 may transfer heat to the vessel 302 (and the working fluid positioned therein) directly. For example, the heat may be transferred without direct fluid communication to the working fluid.

Further, the heat sink 348 is a second component of the motor vehicle 350, which may be any suitable component of the motor vehicle 350. For the embodiment depicted in FIG. 15, the second component is configured as the radiator 356 of the motor vehicle 350. The radiator 356 includes an output hose 370 and a radiator input hose 372. The output hose 370 is configured to provide cooled fluid to the combustion engine 352. Further, for the embodiment depicted in FIG. 15, the output hose 370 wraps around the second fluid line assembly 310 for cooling working fluid within the second fluid line assembly 310. The radiator input hose 372 of the radiator 356 brings heated coolant from the engine 352 to the radiator 356 for cooling.

It should be appreciated, however, that in other exemplary embodiments, the heating device 304 and heat sink 348 may be any other suitable components of the motor vehicle 350, and the vessel 302 may have any other suitable configuration. For example, in other exemplary embodiments, the heating device 304 may be an exterior panel 365 of the motor vehicle 350 and the vessel 302 may be configured in a similar manner as one or more of the exemplary vessels 302 of FIG. 10 or 11. For example, in certain exemplary embodiments, the vessel 302 may be conduit attached directly to an exterior panel 365 of the motor vehicle, or alternatively, formed integrally with one or more of the exterior panels 365 the motor vehicle 350 (FIG. 14). With such a configuration, the system 300 may extract work (e.g., charge the batteries 362, see discussion below) even when the motor vehicle 350 is not moving and not running, such as while parked in the sun, or any location with ambient temperature high enough to produce fluid pressure in the working fluid.

Further, in still other exemplary embodiments, the second fluid line assembly 310 may be thermally coupled to the output hose 370 of the radiator 356 in any other suitable manner. For example, in certain exemplary embodiments, at least a portion of the second fluid line assembly 310 and output hose 370 may extend coaxially with one another or parallel with one another. For example, referring briefly to FIG. 16, providing a cross-sectional view of one embodiment of the present disclosure, at least a portion of the second fluid line assembly 310 may surround the output hose 370 of the radiator 356 and extend coaxially with the output hose 370 of the radiator 356. Similarly, in other exemplary embodiments, the first fluid line assembly 308 may be positioned in thermal communication with the radiator input hose 372 of the radiator 356, e.g., in a similar manner. Additionally, or alternatively, the heat sink 348 may be any other component of, or location on, the motor vehicle with a reduced temperature. For example, in certain exemplary embodiments, the heat sink 348 may be an undercarriage location of the motor vehicle 350 exposed to shaded airflow and further may include fins, pins, dimples, or other heat transfer features configured to increase a heat transfer with such airflow.

Referring still to FIG. 15, it will be appreciated that for the embodiment depicted, the conversion tool 306, in extracting work from the expanded working fluid, is configured to generate electricity using the expanded working fluid. Accordingly, for example, in certain exemplary aspects, the conversion tool 306 of FIG. 15, may be configured in a similar manner to the exemplary conversion tool 306 described above with reference to FIG. 8 (or as the hydraulic generator, discussed above). Moreover, the conversion tool 306 includes an output electrical line 332, with the output electrical line 332 electrically connected to the electric energy storage unit 362. In such a manner, the system 300 may be configured for charging the electric energy storage unit 362 during operation of the motor vehicle 350 (FIG. 14) substantially continuously. Further, in such a manner, the system 300 may be configured for storing the electric energy storage unit 362 when the motor vehicle 350 is not operating, such as when the motor vehicle is parked in a location exposed to the sun.

It will be appreciated that inclusion of a system 300 in accordance with one or more exemplary aspects of the present disclosure may therefore increase an overall efficiency of a motor vehicle by converting otherwise waste heat to electrical power, and feeding such electrical power back into the electrical drive system of the motor vehicle.

Moreover, another potential application for the exemplary system 300 of FIG. 7 is utilized with a solar panel assembly. For example, the system 300 may be configured to reduce a temperature of one or more solar panels of the solar panel assembly, such that the solar panel assembly may operate more efficiently, while at the same time extracting additional work. For example, referring now to FIG. 17, an exemplary solar panel assembly 380 with which the system 300 of FIG. 7 may be utilized is provided. As is depicted schematically, the exemplary solar panel assembly 380 includes a solar panel 382 positioned to receive thermal energy from the sun during operation. During operation, the solar panel 382 may convert thermal energy from the sun to electrical power in a known (or future-developed) manner, which may be transferred through an output electrical line 383 to an electric energy storage unit 384 of the solar panel assembly 380. Additionally, the solar panel 382 is mounted to a stand 385, which is positioned on the ground 386. Of course, however, in other exemplary embodiments, the solar panel 382 of the solar panel assembly 380 may be mounted at any other suitable location for receiving thermal energy from the sun, may include any suitable number or configuration of solar panels 382, and/or may provide electrical power directly to an electric power consuming device or grid (i.e., may not include the energy storage unit 384).

Figure 17:
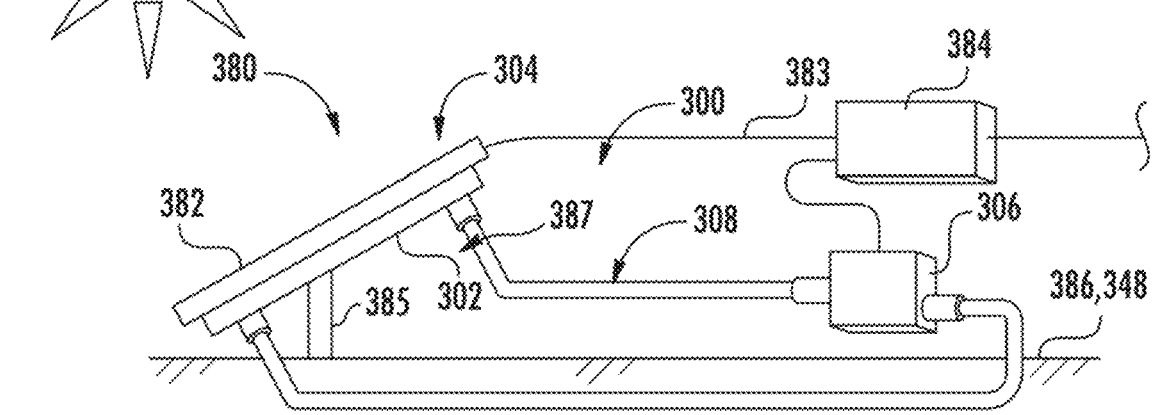
FIG. 17 is a schematic view of a solar panel assembly and system in accordance with an exemplary embodiment of the present disclosure.
Figure 18:
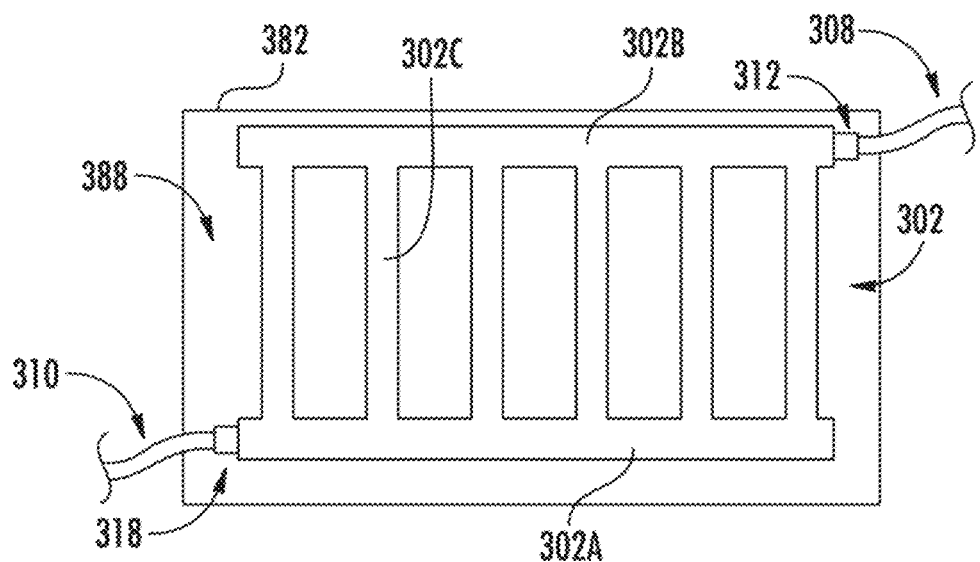
FIG. 18 is a schematic view of a back side of a solar panel of the exemplary solar panel assembly of FIG. 17, along with a close-up view of a vessel of the exemplary system of FIG. 17.
Figure 19:
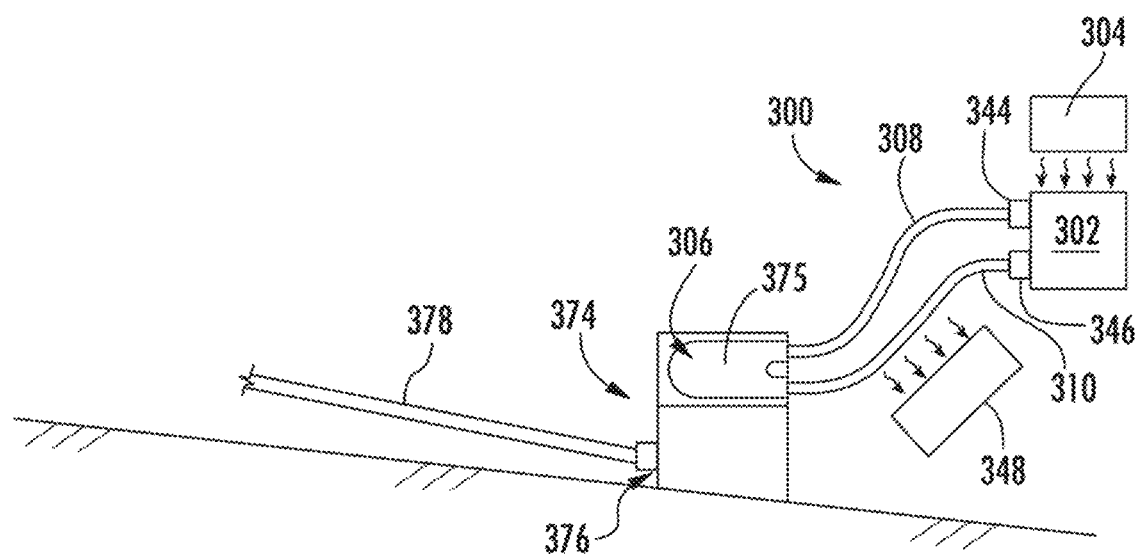
FIG. 19 is a system for extracting work in accordance with another exemplary embodiment of the present disclosure.

Moreover, the exemplary system 300 of FIG. 17 may be configured in substantially the same manner as exemplary system 300 described above with reference to FIG. 7. For example, the exemplary system 300 of FIG. 17 generally includes a vessel 302 having at least a portion of the working fluid positioned therein, a heating device 304 in thermal communication with the portion of the working fluid in the vessel 302, a first fluid line assembly 308, a second fluid line assembly 310, and a conversion tool 306 fluidly connected to the vessel 302 through the first fluid line assembly 308 and the second fluid line assembly 310. Moreover, the second fluid line assembly 310 is configured for thermal communication with a heat sink 348. For the embodiment depicted, the conversion tool 306 is configured to generate electricity using the expanded working fluid from the vessel 302 (see, e.g., FIG. 8), and accordingly includes an electric output hose 390. The electric output hose 390 is, for the embodiment depicted, electrically connected to the electric energy storage unit 384 of the solar panel assembly 380. However, in other exemplary embodiments, the output hose 390 may instead provide electrical power directly to, e.g., the electric output hose 383 (e.g., through one or more power electronics), directly to an electrical power consuming device or grid, etc.

By contrast to the above described embodiments of the system 300, however, the exemplary heating device 304 in the embodiment of FIG. 17 is the solar panel assembly 380, and more specifically, is a back side 388 of the solar panel 382 of the solar panel assembly 380. For example, referring now also to FIG. 18, a schematic view of the backside 388 of the solar panel 382 of the solar panel assembly 380 of FIG. 17 is provided. As is depicted, the vessel 302 is mounted directly to, and in contact with the backside 388 of the solar panel 382, such that the solar panel 382 may transfer heat directly to the vessel 302, and more specifically, to the working fluid positioned therein. Notably, as is also depicted, the vessel 302 is configured in a similar manner as the exemplary vessel 302 of FIG. 11. More specifically, the exemplary vessel 302 includes a first reservoir section 302A and a second reservoir section 302B, with a plurality of fluid connection members 302C extending therebetween. Such a configuration may allow for the vessel 302 to accept a maximum amount of heat from the backside 388 of the solar panel 382 of the solar panel assembly 380.

Referring back to FIG. 17, as stated, the second fluid line assembly 310 is configured for thermal communication with a heat sink 348. For the embodiment depicted, the heat sink 348 is configured as a section of the ground 386 proximate to where the solar panel assembly 380 is mounted. More specifically, at least a portion of the second fluid line assembly 310 is buried beneath the surface of the ground 386, wherein an ambient temperature of the ground 386 may be relatively low, such that it may cool the working fluid within such section of the second fluid line assembly 310. Notably, however, in other exemplary embodiments, the heat sink 348 may additionally, or alternatively, be a shaded section 387 above the ground, e.g., beneath the solar panel 382 or at some other location.

Accordingly, it will be appreciated that with such an exemplary aspect, during operation, heat from the solar panel 382 of the solar panel assembly 380 may be transferred to the vessel 302 to heat the working fluid within the vessel 302 and expand and/or vaporize at least a portion of the working fluid. The expanded and/or vaporized working fluid within the vessel may then be transferred through the first fluid line assembly 308 to the conversion tool 306. The conversion tool 306 may, in certain exemplary aspects, extract electrical power from the expanded/vaporized working fluid from the first fluid line assembly, prior to providing such working fluid back to the second fluid line assembly 310. The working fluid in the second fluid line assembly may then travel through the second fluid line assembly, beneath the ground 386, wherein an ambient temperature of the ground 386 may reduce a temperature of the working fluid in such section of the second fluid line assembly 310. The reduction in temperature of the second fluid line assembly may result in the working fluid contracting and/or condensing. Additionally, a negative pressure differential within the vessel 302, relative to the second fluid line assembly 310, may cause the working fluid within the second fluid line assembly to travel back into the vessel 302, wherein the process may repeat.

It should be appreciated, however, that in still other exemplary embodiments, any other suitable configuration may be provided. For example, although the exemplary system 300 of FIGS. 13 and 14 is described as being utilized with a solar panel assembly, in other exemplary aspects, the exemplary system 300 may be utilized with any other suitable heating device configured to capture thermal energy from the sun. For example, the heating device may instead be a blank metal plate, a flat black plate or component, a component including thermal features such as fins for capturing additional heat, etc.

Moreover, in still other exemplary embodiments, the exemplary system 300 may have any other suitable configuration. For example, referring now to FIG. 19, a system 300 in accordance with yet another exemplary embodiment of the present disclosure is provided. The exemplary system 300 of FIG. 19 may be configured in a similar manner as exemplary system 300 of FIG. 7. For example, the exemplary system 300 of FIG. 19 generally includes a vessel 302 having at least a portion of the working fluid positioned therein, a heating device 304 in thermal communication with the portion of the working fluid in the vessel 302, a first fluid line assembly 308, a second fluid line assembly 310, a conversion tool 306 fluidly connected to the vessel 302 through the first fluid line assembly 308 and the second fluid line assembly 310, and a heat sink 348 in thermal communication with the second fluid line assembly 310.

For the embodiment depicted, the conversion tool 306 is configured to provide a mechanical output force using the expanded working fluid. More specifically, for the embodiment of FIG. 19, the conversion tool 306 is operable as a water pump. More specifically, for the embodiment depicted, the conversion tool 306 is operable with a water tank or other water reservoir 374. The water reservoir 374 may be configured to receive water from, e.g., a natural water source such as a river, stream, or a lake. The conversion tool 306 is configured to receive pressurized working fluid from the first fluid line assembly 308 to increase a pressure within the water reservoir 374. Such may allow for the water reservoir 374 to provide a flow of pressurized water through an outlet 376. Specifically, for the embodiment depicted, the system 300 allows for a flow of pressurized water through the outlet 374 to an outlet line 378, which may be provided to a remote location, e.g., at a higher elevation than the water reservoir 374. It will be appreciated that in at least certain exemplary embodiments, the conversion tool 306 may include, e.g., a flexible bladder or other non-rigid container 375 within the reservoir configured to expand in response to receiving the pressurized working fluid from the first fluid line assembly 308. The expansion of the bladder or container 375 may force water out through the outlet 376 to the outlet line 378 at an increased pressure. The water reservoir 374 may then receive additional water from the water source (e.g., river), compressing the bladder or container 375 and assisting with providing the working fluid to the vessel 302 through the second fluid line assembly 310. One or more pressure valves 344 and/or one-way check valves 346 may be included to ensure proper flow direction of the working fluid that the system.

By way of example, in certain embodiments, the pressure valve 344 may be configured to allow a flow of working fluid therethrough once a certain maximum pressure is reached, and may then continue to allow the flow of working fluid therethrough until the pressure falls below a certain minimum pressure. By way of example only, the pressure valve 344 may initially allow working fluid to flow therethrough once an upstream pressure reaches a maximum pressure of, e.g., two hundred pounds per square inch (psi), and may continue to allow the flow of working fluid until the upstream pressure reaches a minimum pressure of, e.g., fifty psi. In such a manner, the working fluid may "pulse" through the system 300.

Moreover, one or more of the water reservoir 374, outlet 376, and outlet line 378 may also include one-way check valves to ensure proper flow direction. As will be appreciated, the vessel 302, heating device 304, etc. may have any suitable configuration. Additionally, with such a configuration, the heat sink 348 may be, e.g., the water source for the water reservoir 374 or may be in thermal communication with the water source for the water reservoir 374. For example, the section of the second fluid line assembly 310 may be positioned in a river providing water to the reservoir 374.

Furthermore, in still other exemplary embodiments, the exemplary system 300 may have any other suitable configuration. For example, referring now to FIG. 20, a system 300 in accordance with yet another exemplary embodiment of the present disclosure is provided. The exemplary system 300 of FIG. 20 may also be configured in a similar manner as exemplary system 300 of FIG. 7. For example, the exemplary system 300 of FIG. 20 generally includes a vessel 302 having at least a portion of the working fluid positioned therein, a heating device 304 in thermal communication with the portion of the working fluid in the vessel 302, a first fluid line assembly 308, a second fluid line assembly 310, a conversion tool 306 fluidly connected to the vessel 302 through the first fluid line assembly 308 and the second fluid line assembly 310, and a heat sink 348 in thermal communication with the second fluid line assembly 310.

For the embodiment depicted, system 300 is operable with a buoy 380. The buoy 380 may be positioned, e.g., in a lake, an ocean, a causeway, or any other body of water. For the embodiment depicted, heating device 304 is configured as a plate 381 configured to receive thermal energy from the sun. The vessel 302 is mounted to the plate 381, such that the plate 381 transfers thermal energy to the working fluid within the vessel 302. For example, in certain exemplary embodiments, the heating device 304 and plate 381 may be configured in a similar manner to the exemplary vessel 302 and opposing rigid plates 307 described above with reference to FIG. 13. Alternatively, however, any other suitable vessel 302 and heating device 304 may be utilized. For example, in other exemplary embodiments, the heating device 304 may be integrated into the vessel 302, e.g., as a wall of the vessel configured in a manner to receive thermal energy from the sun (e.g., painted flat black, including thermal transfer features, etc.).

Figure 20:
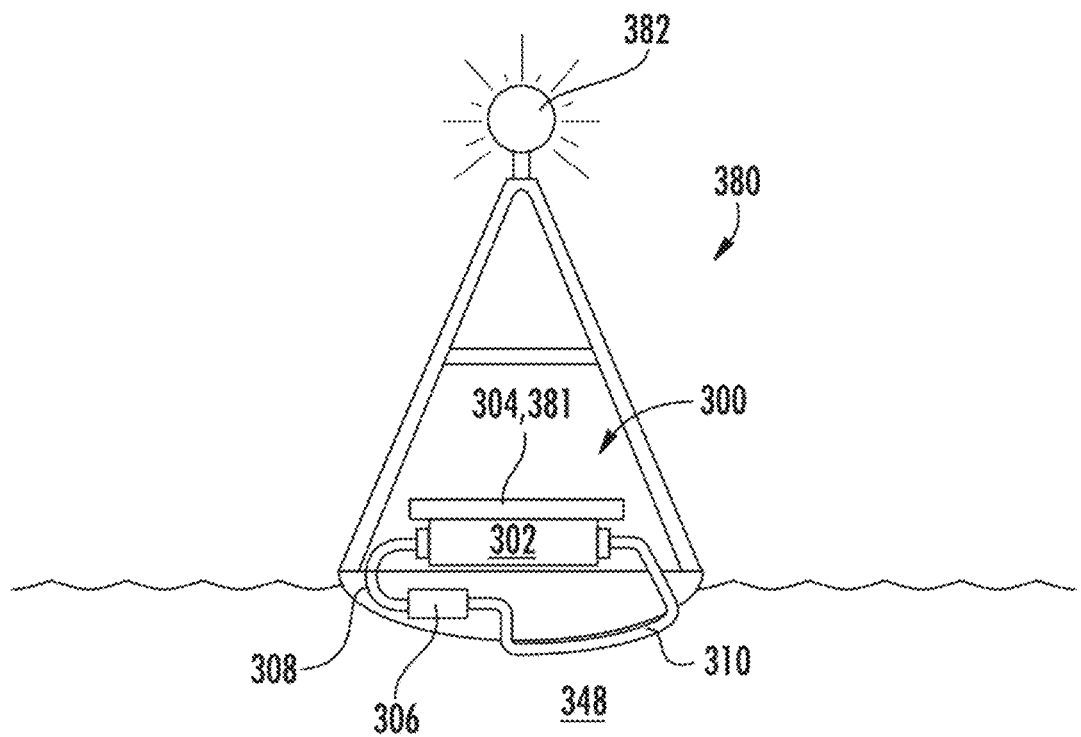
FIG. 20 is a system for extracting work in accordance with yet another exemplary embodiment of the present disclosure.

Further, for the embodiment of FIG. 20, the conversion tool 306 is configured to generate electrical power from the expanded working fluid. Accordingly, the conversion tool 306 may be configured in a similar manner to the exemplary conversion tool 306 described above with reference to FIG. 8. Moreover, the conversion tool 306 is configured to provide electrical power to an electrical sink, i.e., a light 382 positioned on the buoy 380 of the embodiment depicted. In such a manner, the exemplary system 300 may power the light 382 on the buoy 380. Referring still to FIG. 20, the exemplary system 300 depicted is configured to utilize the body of water within which the buoy 380 is positioned at the heat sink 348.

Notably, for the embodiment depicted, the system 300 is incorporated into the buoy 380. It should be appreciated, however, that in other exemplary embodiments, the system 300, or one or more components thereof, may instead be tethered to the buoy 380 and positioned at least partially on a floatation device. In such a manner, certain components of the system 300 may be wider than the buoy 380, for example, the heating device 304 of the system 300 may be wider than the buoy 380 and directly exposed to the sun.

Figure 21:
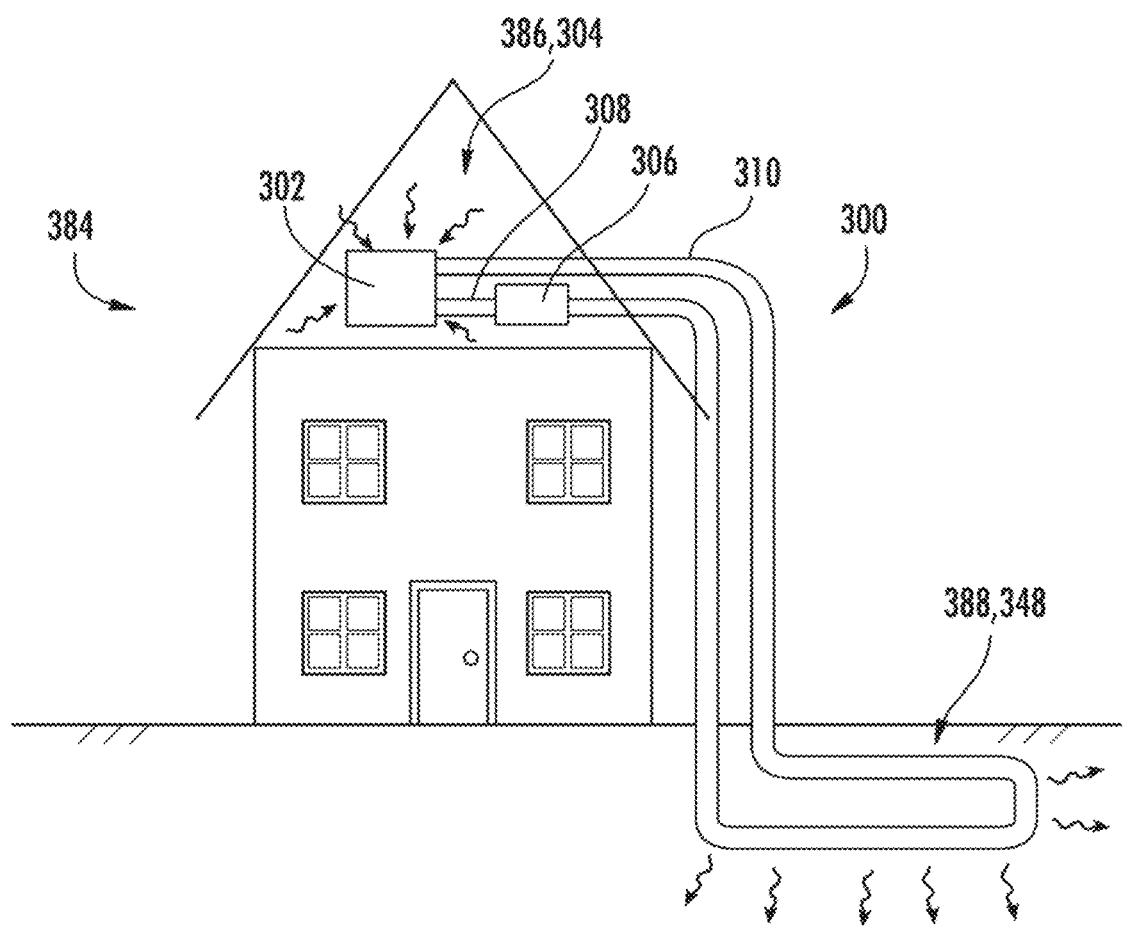
FIG. 21 is a system for extracting work in accordance with still another exemplary embodiment of the present disclosure.

Referring now to FIG. 21, a system 300 in accordance with yet another exemplary embodiment of the present disclosure is depicted. The exemplary embodiment of FIG. 21 may also be configured in a similar manner as exemplary system 300 of FIG. 7. For example, the exemplary system 300 of FIG. 21 generally includes a vessel 302 having at least a portion of the working fluid positioned therein, a heating device 304 in thermal communication with the portion of the working fluid in the vessel 302, a first fluid line assembly 308, a second fluid line assembly 310, a conversion tool 306 fluidly connected to the vessel 302 through the first fluid line assembly 308 and the second fluid line assembly 310, and a heat sink 348 in thermal communication with the second fluid line assembly 310.

For the embodiment depicted, system 300 it is operable with a building 384. More specifically, the exemplary system 300 of FIG. 21 is operable with an un-cooled, top floor 386 of the building 384, such as in attic of a home. The top floor 386 may receive thermal energy from, e.g., the sun and accordingly may act as the heat source 304 of the system 300. Accordingly, the top floor 386 may transfer heat to the working fluid within the vessel 302 to expand the working fluid. Working fluid may be provided through the first fluid line 308 assembly to the conversion tool 306, which may be configured to generate electrical power. For example, the conversion tool 306 may be configured in a similar manner to the exemplary conversion tool 306 described above with reference to FIG. 8. The working fluid is then provided to the second fluid line assembly 310. The second fluid line assembly 310, for the embodiment depicted, extends to a belowground location 388, with such belowground location 388 acting as the heat sink 348. The second fluid line assembly 310 further provides the working fluid back to the vessel 302.

Although the vessel 302 is depicted as a tank in FIG. 21, in other exemplary embodiments, any other suitable vessel may be utilized. For example, in other exemplary embodiments, one or more the exemplary vessels described above with reference to FIG. 10 through 13 may be utilized. Additionally, although the second fluid line assembly 310 is depicted as extending to the belowground location 388 to cool the working fluid within the second fluid line assembly (i.e., the belowground location 310 acting at least in part as the heat sink 348), in other exemplary embodiments, the second fluid line assembly 310 may additionally, or alternatively, extend to any other location having a reduced temperature relative to the top floor 386 of the building 384, with such other location acting at least in part as the heat sink 348. For example, in other exemplary embodiments, the building 384 may be a garage, the top floor 386 may be an attic over the garage, and the second fluid line assembly may extend into a main floor of the garage to cool the working fluid. Additionally, or alternatively, still, the second fluid line assembly 310 may extend to a shaded location outside the building 384, extend into and through a rain barrel (above ground, or below ground) or other water storage device, etc.

Further, in still other exemplary embodiments, one or more of the exemplary systems 300 described above may include aspects of one or more the exemplary systems 10 described above with reference to FIGS. 1 through 6. Additionally, although the exemplary systems 300 have been described as utilizing a phase change fluid, in other exemplary embodiments, the working fluid may instead be a working liquid, similar to the exemplary systems 10 described above with reference to FIGS. 1 through 6.

Figure 22:
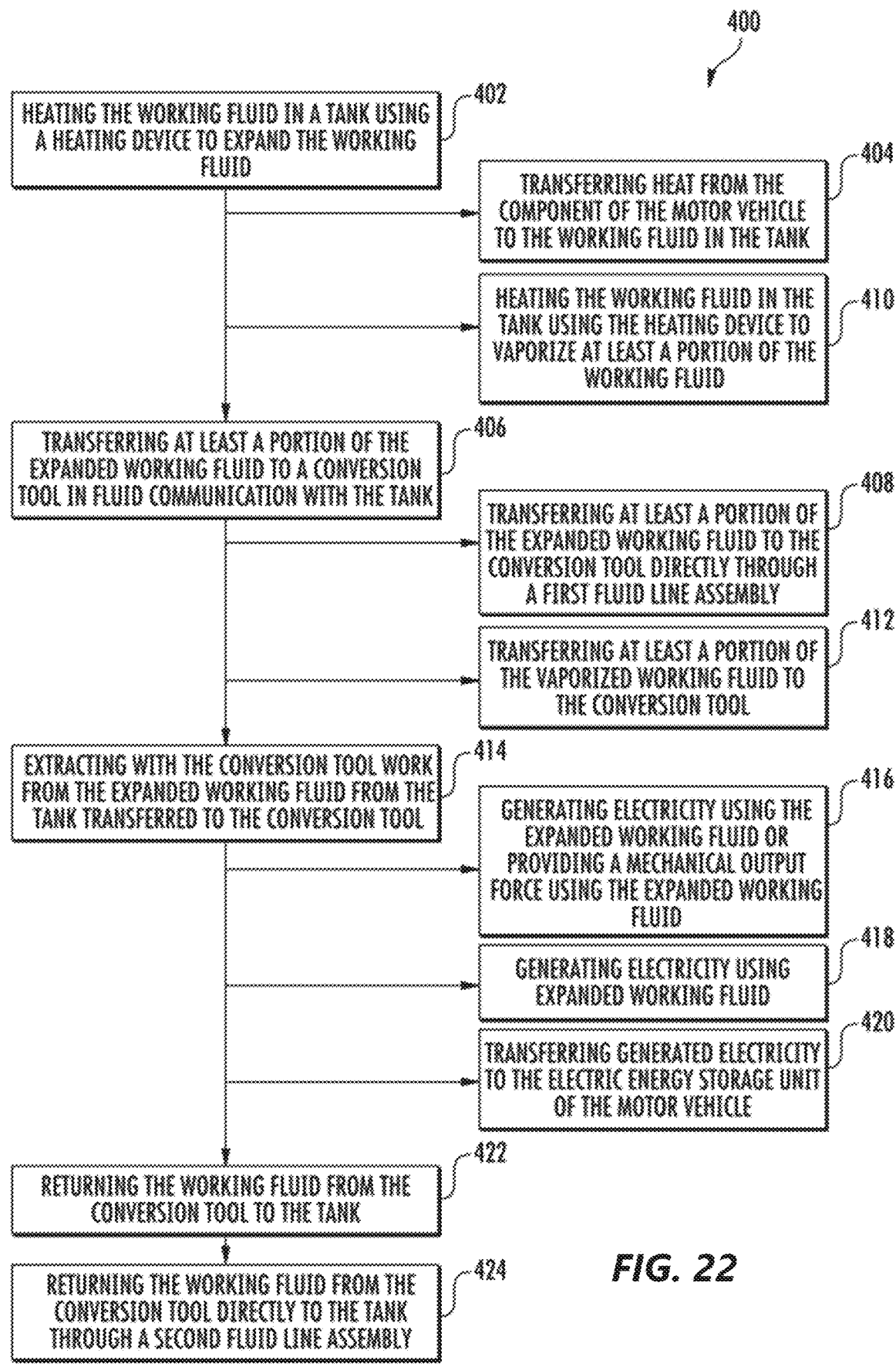
FIG. 22 is a flow diagram of a method for extracting work in accordance with an exemplary aspect of the present disclosure.

Referring now to FIG. 22, a method 400 for extracting work from the expansion of the working fluid in accordance with an exemplary aspect of the present disclosure is provided. The exemplary method 400 may be utilized with one or more the exemplary systems 300 described above with reference to FIGS. 7 through 21.

The method 400 generally includes at (402) heating the working fluid in a vessel using a heating device to expand the working fluid in the vessel. As stated, in certain exemplary embodiments, the method 400 may be utilized with the system described above with reference to FIGS. 14 and 15. Accordingly, in such an exemplary embodiment, the heating device may be a component of a motor vehicle, such that heating the working fluid in the vessel using the heating device at (402) includes at (404) transferring heat from the component of the motor vehicle to the working fluid in the vessel. The component of the motor vehicle may be, e.g., a combustion engine of the motor vehicle, an exhaust of the motor vehicle, or any other suitable heat source. However, in other exemplary aspects, the method 400 may be utilized with any other suitable system, and thus, heating the working fluid in the vessel using the heating device at (402) may include transferring heat from any other suitable heating device to the working fluid vessel.

The method 400 further includes at (406) transferring at least a portion of the expanded working fluid to a conversion tool in fluid communication with the vessel. For the exemplary aspect depicted, transferring at least a portion of the expanded working fluid to the conversion tool includes at (408) transferring at least a portion of the expanded working fluid to the conversion tool directly through a first fluid line assembly. The first fluid line assembly may be directly fluidly connecting the vessel to the conversion tool. Further, it will be appreciated, that in at least certain exemplary aspects of the present disclosure, the working fluid may be a phase change fluid. Accordingly, with such an exemplary aspect, heating the working fluid in the vessel using the heating device at (402) may further include at (410) heating the working fluid in the vessel using the heating device to vaporize at least a portion of the working fluid in the vessel. Further, with such an exemplary aspect, transferring at least a portion of the expanded working fluid to the conversion tool at (406) includes at (412) transferring at least a portion of the vaporized working fluid to the conversion tool.

Referring still to FIG. 22, the method 400 further includes at (414) extracting with the conversion tool work from the expanded working fluid from the vessel transferred to the conversion tool at (412). In certain exemplary aspects, extracting with the conversion tool work from the expanded working fluid from the vessel transferred to the conversion tool at (414) includes at (416) generating electricity using the expanded working fluid or providing a mechanical output force using the expanded working fluid. More particularly, for the exemplary aspect depicted, extracting with the conversion tool work from the expanded working fluid from the vessel transferred to the conversion tool at (414) includes at (418) generating electricity using expanded working fluid.

Moreover, as previously discussed, the exemplary method 400 may be utilized with the exemplary system described above with reference to FIGS. 14 and 15. Accordingly, the system may be integrated into a motor vehicle having an electric energy storage unit. With such an exemplary aspect, as is depicted, extracting with the conversion tool work from the expanded working fluid from the vessel transferred to the conversion tool at (414) further includes at (420) transferring generated electricity to the electric energy storage unit of the motor vehicle. However, in other exemplary aspects, the method 400 may additionally, or alternatively, be utilized with the exemplary system described above with reference to FIGS. 17 and 18. With such an exemplary aspect, the solar panel assembly may similarly include an electric energy storage unit, and extracting with the conversion tool work from the expanded working fluid from the vessel transferred to the conversion tool at (414) may further include transferring generated electricity to the electric energy storage unit of the solar panel assembly.

Furthermore, referring still to FIG. 22, the method 400 further includes at (422) returning the working fluid from the conversion tool to the vessel. More specifically, for the exemplary aspect depicted, the returning the working fluid from the conversion tool to the vessel at (422) includes at (424) returning the working fluid from the conversion tool directly to the vessel through a second fluid line assembly. The second fluid line assembly may be directly fluidly connecting the conversion tool to the vessel.

Figure 23:
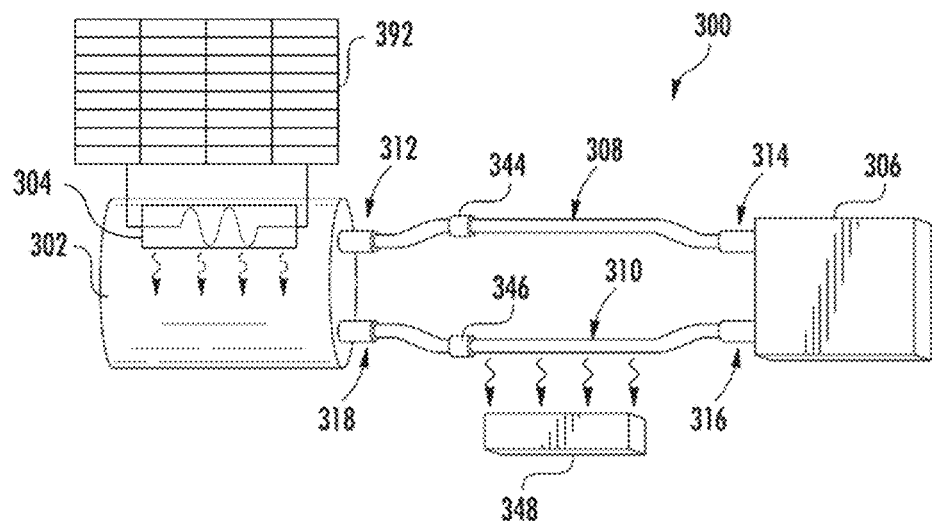
FIG. 23 is a system for extracting work in accordance with another exemplary embodiment of the present disclosure.

Referring now to FIG. 23, a system 300 in accordance with yet another exemplary embodiment of the present disclosure is depicted. The exemplary embodiment of FIG. 23 may also be configured in a similar manner as exemplary system 300 of FIG. 7. For example, the exemplary system 300 of FIG. 23 generally includes a vessel 302 having at least a portion of the working fluid positioned therein, a heating device 304 in thermal communication with the portion of the working fluid in the vessel 302, a first fluid line assembly 308, a second fluid line assembly 310, a conversion tool 306 fluidly connected to the vessel 302 through the first fluid line assembly 308 and the second fluid line assembly 310, and a heat sink 348 in thermal communication with the second fluid line assembly 310.

In particular, the system 300 of FIG. 23 includes a heating element 304 that is disposed within an interior of the vessel 302. For instance, the heating element 304 can be placed in direct thermal communication and/or fluid flow communication (e.g., as opposed to fluid flow isolation) with at least a portion of the working fluid in the interior of the vessel 302. The heating element 304 can be any suitable heating element. In one particular example embodiment, and as illustrated in FIG. 23, the heating element 304 can be an electrical resistance heating element, such as a heating element that generates heat by exploiting thermal energy emitted by the movement of electrical charge through high resistance (e.g., a heating coil). Additionally and/or alternatively, in some implementations, thermal conduction can be utilized to transmit thermal energy to the heating element 304. The heating element 304 (e.g., an electrical resistance heating element) can be powered by any suitable electrical source. In one particular example embodiment, and as illustrated in FIG. 23, the heating element 304 can be solar powered. For instance, the heating element 304 can be coupled to and/or powered by solar panel 392.

Figure 24:
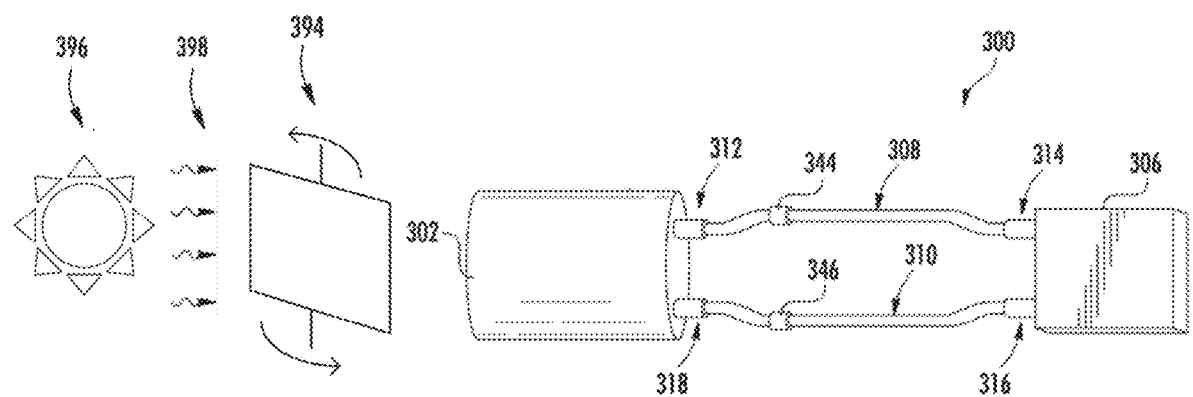
FIG. 24 is a system for extracting work in accordance with another exemplary embodiment of the present disclosure.

Referring now to FIG. 24, a system 300 in accordance with yet another exemplary embodiment of the present disclosure is depicted. The exemplary embodiment of FIG. 24 may also be configured in a similar manner as exemplary system 300 of FIG. 7. For example, the exemplary system 300 of FIG. 24 generally includes a vessel 302 having at least a portion of the working fluid positioned therein, a first fluid line assembly 308, a second fluid line assembly 310, and a conversion tool 306 fluidly connected to the vessel 302 through the first fluid line assembly 308 and the second fluid line assembly 310. In some implementations, the system 300 of FIG. 24 can include a heating device in thermal communication with the portion of the working fluid in the vessel 302 and/or a heat sink in thermal communication with the second fluid line assembly 310 as described herein, although the heating device and heat sink are omitted from FIG. 24 for the purpose of illustration.

In particular, the system 300 of FIG. 24 includes a rotating shade 394. The rotating shade 394 can revolve about an axis to selectively expose the vessel 302 to thermal radiation 398 from the sun 396 (and/or other suitable thermal radiation source). For instance, the rotating shade 394 can continually revolve, such as at a constant speed, such that the vessel 302 is periodically exposed to cycles of thermal radiation 398. As one example, the rotating shade 394 can be driven by a motor, such as revolved by continual revolution of a motor. For instance, in some embodiments, the rotating shade 394 can be substantially planar. When a plane of the rotating shade 394 is coplanar with rays of radiant thermal energy 398 from the sun 396, the shade 394 may block substantially no energy 398, thereby heating the vessel 302. Alternatively, when the shade 394 is near perpendicular to the rays of energy 398, the radiant thermal energy 398 from the sun 396 is blocked from reaching the vessel 302, such that the vessel 302 is positioned in the shade, thereby cooling the vessel 302. Compared to alternative methods of obstructing thermal radiation, such as slit-type shades, the rotating shade 394 can require reduced energy to power and/or provide more consistent performance. For example, the rotating shade 394 can require low enough energy to be run off of energy produced by the system 300. Additionally and/or alternatively, the rotating shade 394 can have fewer points of failure (e.g., likely sources of malfunction) than slit-type shades, such as by having fewer moving parts, mechanical components, moveable joints, component connections, and other points prone to failure.

Cycles of exposure to thermal radiation 398 can be sufficient, in some cases, for operation of system 300 (e.g., extracting work from system 300). As an example, the use of a rotating shade 394 with a working fluid having high density and/or pressure volatility, such as isopentane, isobutane, ether, etc., can provide for significant enough changes in density, and thereby pressure, to extract useful work from only the thermal radiation. This can be especially beneficial in environments where the thermal radiation 398 is great, such as in outer space (e.g., on a satellite, surface of an extraterrestrial body) where no or limited atmosphere exists to block thermal radiation 398 from the sun 396. As one example, fluctuations on the order of 500 degrees Fahrenheit can be experienced on a lunar surface simply based on incident thermal radiation.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for extracting work from the expansion of a working fluid, comprising:
   a vessel comprising at least a portion of the working fluid and defining an interior, wherein the working fluid is not water;
   a heating device in thermal communication with the portion of the working fluid in the vessel for heating the portion of the working fluid in the vessel and expanding the working fluid, the heating device being in fluid flow isolation from the working fluid within the interior of the vessel; and
   a conversion tool in fluid communication with the vessel configured to receive working fluid from the vessel when the working fluid expands, the conversion tool further configured to extract work from the expanded working fluid;
   a first fluid line assembly extending between the vessel and the conversion tool and connecting the vessel to the conversion tool for supplying expanded working fluid from the vessel to the conversion tool;
   a second fluid line assembly fluidly connects the conversion tool to the vessel for returning working fluid from the conversion tool to the vessel, wherein substantially all of the working fluid from the conversion tool is provided back to the vessel through the second fluid line assembly;
   wherein the heating device is not a combustion engine heating device, wherein the heating device is a component of a motor vehicle, wherein the vessel is mounted in thermal communication with the component, wherein in extracting work from the expanded working fluid the conversion tool is configured to generate electricity using the expanded working fluid, wherein the motor vehicle comprises an electric energy storage unit, and wherein the conversion tool is configured to provide electrical power to the electric energy storage unit during operation of the system, and wherein the heating device does not include vehicle exhaust gasses in direct fluid communication with the working fluid.

2. The system of claim 1, wherein in extracting work from the expanded working fluid, the conversion tool is configured to generate electricity using the expanded working fluid or to provide a mechanical output force using the expanded working fluid.

3. The system of claim 1, wherein the heating device is in direct thermal communication with the portion of the working fluid in the vessel for heating the portion of the working fluid in the vessel and expanding the working fluid.

4. The system of claim 1, wherein the heating device is in indirect thermal communication with the portion of the working fluid in the vessel for heating the portion of the working fluid in the vessel and expanding the working fluid.

5. The system of claim 1, wherein the heating device comprises a rotating shade, the rotating shade configured to revolve about an axis to selectively expose the vessel to thermal radiation.

6. The system of claim 5, wherein the rotating shade is driven by a motor.

7. The system of claim 5, wherein the rotating shade is planar.

8. The system of claim 5, wherein the thermal radiation comprises solar radiation.

9. The system of claim 1, wherein the working fluid comprises at least one of isopentane, butane, or isobutane.

10. A system for extracting work from the expansion of a working fluid, comprising:
    a vessel comprising at least a portion of the working fluid and defining an interior, wherein the working fluid is not water;
    a heating device in thermal communication with the portion of the working fluid in the vessel for heating the portion of the working fluid in the vessel and expanding the working fluid, the heating device being disposed within the interior of the vessel; and
    a conversion tool in fluid communication with the vessel configured to receive working fluid from the vessel when the working fluid expands, the conversion tool further configured to extract work from the expanded working fluid;
    a first fluid line assembly extending between the vessel and the conversion tool and connecting the vessel to the conversion tool for supplying expanded working fluid from the vessel to the conversion tool;
    a second fluid line assembly fluidly connects the conversion tool to the vessel for returning working fluid from the conversion tool to the vessel, wherein substantially all of the working fluid from the conversion tool is provided back to the vessel through the second fluid line assembly;
    wherein the heating device is not a combustion engine heating device, wherein the heating device is a component of a motor vehicle, wherein the vessel is mounted in thermal communication with the component, wherein in extracting work from the expanded working fluid the conversion tool is configured to generate electricity using the expanded working fluid, wherein the motor vehicle comprises an electric energy storage unit, and wherein the conversion tool is configured to provide electrical power to the electric energy storage unit during operation of the system, and wherein the heating device does not include vehicle exhaust gasses in direct fluid communication with the working fluid.

11. The system of claim 10, wherein the heating device comprises an electrical resistance heating element.

12. The system of claim 10, wherein the heating device is solar powered.

13. A method for extracting work from the expansion of a working fluid in a system, the method comprising:
    heating, via a heating device, the working fluid in a vessel by exposing the vessel to thermal radiation to expand the working fluid in the vessel using radiation heat transfer;
    transferring at least a portion of the expanded working fluid to a conversion tool in fluid communication with the vessel;

extracting work with the conversion tool from the expanded working fluid from the vessel transferred to the conversion tool; and returning substantially all of the working fluid from the conversion tool to the vessel;

wherein the working fluid is not water, wherein the heating device is a component of a motor vehicle, wherein the vessel is mounted in thermal communication with the component, wherein in extracting work from the expanded working fluid the conversion tool is configured to generate electricity using the expanded working fluid, wherein the motor vehicle comprises an electric energy storage unit, and wherein the conversion tool is configured to provide electrical power to the electric energy storage unit during operation of the system, and wherein the heating device does not include vehicle exhaust gasses in direct fluid communication with the working fluid.

14. The method of claim 13, wherein the working fluid is a phase change fluid, wherein heating the working fluid in the vessel to expand the working fluid in the vessel comprises vaporizing at least a portion of the working fluid in the vessel, and wherein transferring at least a portion of the expanded working fluid to the conversion tool comprises transferring at least a portion of the vaporized working fluid to the conversion tool.

15. The method of claim 13, wherein extracting with the conversion tool work from the expanded working fluid from the vessel transferred to the conversion tool comprises generating electricity using the expanded working fluid or providing a mechanical output force using the expanded working fluid.

16. The method of claim 13, wherein heating the working fluid in a vessel by exposing the vessel to thermal radiation to expand the working fluid in the vessel using radiation heat transfer comprises rotating a rotating shade such that the rotating shade allows the thermal radiation to pass through the rotating shade and be incident on the vessel.

17. The method of claim 16, further comprising cooling the working fluid, wherein cooling the working fluid comprises rotating the rotating shade such that the rotating shade blocks the thermal radiation from being incident on the vessel.

18. The method of claim 13, wherein heating the working fluid in the vessel comprises receiving thermal energy from the sun with the heating device and transferring at least a portion of the received thermal energy from the sun to the working fluid in the vessel.

* * * * *